US011324280B2

(12) United States Patent
Hay

(10) Patent No.: US 11,324,280 B2
(45) Date of Patent: May 10, 2022

(54) ROTATABLE MIDSOLE AMBULATORY FOOTWEAR APPARATUS

(71) Applicant: bIVAb LLC, Marblehead, MA (US)

(72) Inventor: Gordon G. Hay, Stowe, VT (US)

(73) Assignee: bIVAb LLC, Marblehead, MA (US)

( * ) Notice: Subject to any disclaimer, the term of this patent is extended or adjusted under 35 U.S.C. 154(b) by 103 days.

(21) Appl. No.: 16/656,540

(22) Filed: Oct. 17, 2019

(65) Prior Publication Data

US 2020/0128909 A1    Apr. 30, 2020

Related U.S. Application Data

(60) Provisional application No. 62/749,807, filed on Oct. 24, 2018.

(51) Int. Cl.

| A43B 13/12 | (2006.01) |
|---|---|
| A43B 13/18 | (2006.01) |
| A43B 13/14 | (2006.01) |
| B29D 35/14 | (2010.01) |
| B29L 31/50 | (2006.01) |

(52) U.S. Cl.
CPC ............ *A43B 13/12* (2013.01); *A43B 13/122* (2013.01); *A43B 13/125* (2013.01); *A43B 13/181* (2013.01); *A43B 13/141* (2013.01); *B29D 35/148* (2013.01); *B29L 2031/504* (2013.01)

(58) Field of Classification Search
CPC ....... A43B 21/39; A43B 21/42; A43B 21/433; A43B 21/47; A43B 21/52; A43B 21/437; A43B 13/122; A43B 13/125; A43B 13/141; A43B 13/171; A43B 13/20; A43B 13/12; A43B 13/37
See application file for complete search history.

(56) References Cited

U.S. PATENT DOCUMENTS

| 2,343,701 A | * | 3/1944 | Pickens ................. A43B 3/128 36/11.5 |
| 4,271,610 A | | 6/1981 | Parrent |

(Continued)

FOREIGN PATENT DOCUMENTS

WO         9312682 A1    7/1993

*Primary Examiner* — Khoa D Huynh
*Assistant Examiner* — Haley A Smith
(74) *Attorney, Agent, or Firm* — North Shore Patents, P.C.; Michele Liu Bailie

(57) ABSTRACT

A footwear apparatus includes a primary outsole having a primary cavity, a secondary outsole connected to the primary outsole and having a secondary cavity, a midsole movably disposed over the primary outsole and secondary outsole including a primary protrusion extending at least partially within the primary cavity, and a tertiary outsole disposed about the primary protrusion. The footwear apparatus defines a z-axis through the secondary cavity and substantially normal to a ground surface, a y-axis extending substantially from the secondary cavity to the primary cavity, and an x-axis substantially normal to a plane created by the z-axis and the y-axis. The midsole is configured to rotate substantially about the x-axis, rotate substantially about the y-axis, to resist rotation substantially about the z-axis. The footwear apparatus is adaptive to a ground surface orientation on which the wearer walks and to rotational movements of the wearers body.

2 Claims, 36 Drawing Sheets

(56) References Cited

U.S. PATENT DOCUMENTS

| | | | |
|---|---|---|---|
| 4,972,611 A | 11/1990 | Swartz et al. | |
| 5,396,675 A | 3/1995 | Vincent et al. | |
| 5,881,478 A | 3/1999 | McMahon et al. | |
| 6,389,712 B1* | 5/2002 | Schelling | A43B 13/122 36/103 |
| D499,240 S* | 12/2004 | Kuo | D2/965 |
| 7,610,695 B2 | 11/2009 | Hay | |
| 8,141,272 B2 | 3/2012 | Hay et al. | |
| 8,341,856 B2 | 1/2013 | Smith et al. | |
| 9,687,044 B2* | 6/2017 | Schindler | A43B 13/223 |
| 9,693,598 B1* | 7/2017 | Rose | A43B 3/246 |
| 10,143,269 B2* | 12/2018 | Leo | A43B 23/24 |
| 2007/0289167 A1* | 12/2007 | Pieriboni | A43B 3/24 36/100 |
| 2008/0022562 A1* | 1/2008 | Manis | A01L 1/00 36/59 R |
| 2009/0094856 A1* | 4/2009 | Guerra | A43B 7/1445 36/29 |
| 2009/0307925 A1* | 12/2009 | Pfister | A43B 7/223 36/28 |
| 2012/0317844 A1* | 12/2012 | Vattes | A43B 13/122 36/25 R |
| 2015/0327624 A1* | 11/2015 | Grott | A43B 5/002 36/91 |
| 2016/0021974 A1* | 1/2016 | Schindler | A43B 13/206 36/103 |
| 2016/0302522 A1* | 10/2016 | Meschter | A43B 13/26 |
| 2018/0153252 A1 | 6/2018 | Archer et al. | |
| 2019/0104805 A1* | 4/2019 | Del Biondi | A43B 13/183 |

\* cited by examiner

ROTATABLE MIDSOLE AMBULATORY FOOTWEAR APPARATUS

FIELD

The present disclosure is related to rotatable midsole ambulatory footwear devices, systems, and methods, and particularly to foot rotation allowance about two axes and foot rotation restriction about a third axis. The devices, systems, and methods described herein relate to footwear that is adaptive, to a ground surface orientation and/or rotational movements of the wearer's body with considerations for comfort and wellbeing of the wearer.

BACKGROUND

Shoe soles are generally made of resilient materials to provide comfort for a user traversing modern hard and flat ground surfaces, e.g., concrete, asphalt, wood, tile, or the like. Soles may be manufactured by adding up to three or more layers to a shoe last in the form of a human foot. The three layers may include an insole for interfacing with a user's foot, a midsole having structure and comfort features for supporting the midsole, and an outsole for interfacing with a ground surface. Midsole layers often have a stiffening rigid shank for stability and for extending the life of the soles. Manmade hard ground surface terrains have produced the development of foam and other force absorbing midsole layers, such as cushioning sneakers.

However, these soles are not adapted to the natural walking or running pattern of a foot engaging the ground. That is, they do not guide the foot along a natural walking or running path. If footwear soles were to better accommodate the natural moving pattern of a foot engaging the ground, user comfort and ambulatory efficiency could be improved.

During walking and running, the human foot typically contacts the ground at the outer portion of the heel. As the step advances, a greater portion of the heel, along with the outer portion of the arch of the foot, then contacts the ground. Next, the inner portion of the ball of the foot contacts the ground. Following the contact by the inner ball of the foot, the remainder of the ball of the foot and the toes contact the ground. At this point, the foot is generally flat on the ground. As the heel begins to leave the ground, weight is transferred to the ball of the foot. After the heel and arch leave the ground, most of a person's weight is concentrated on the inner portion of the ball of the foot. As the foot begins to leave the ground, the inner portion of the ball of the foot and the big toe are the last areas to be in contact with the ground. This natural pattern of contact between the foot and the ground can generally be called an S-shape path. As a step advances, the point of contact is, in order, at the following locations: the heel, the outer arch, the inner ball, and the outer ball. This pattern is described in U.S. Pat. No. 7,610,695, which is hereby incorporated by reference herein for all purposes.

More than one hundred moving bones and joints in each foot transition in shape and position throughout each step and motion of the body. These step motions across variable terrain and shifting support for the movement of the rest of the user's body constantly struggle with reassembling alignment of feet with the legs. For example, when traversing perpendicularly across a sloped hill, a user's downhill foot must transition inwardly (e.g., y-axis inversion pronation), while the uphill, foot must transition outwardly (e.g., y-axis eversion/supination), and both feet must progress in a forward direction (e.g., x-axis plantar flexion and dorsi flexion) to reassemble foot and leg alignment for body stability and mobility.

The described traditional footwear disrupts the natural transition sequence because the foot is restricted from transitioning within the footwear and often is forced into unfavorable rotation about a third axis (e.g., z-axis, as described herein) shearing from the internal and external ankle, and leg rotation with the foot. This rotation about a third axis may be described as similar to the motion of extinguishing a cigarette on the ground with the plantar foot. The plantar foot is prematurely dismantled and forced into a shearing motion about the third axis inside the shoe, compromising alignment and functional health of the foot, ankle, leg, and hip. The plantar foot surface transitions shape within the shoe and does not maintain the single shape of the shoe last for which the shoe may be designed from. For example, a rigid mold of an orthosis will disrupt the foot's ability to transition, like a cast for a broken arm may restrict motion. A rigid sole or shank of a shoe disrupts the foot's ability to transition shape and position within the shoe and amplifies shearing. Excessive cushioning, gel, and foams of typical footwear may cause instability that may disrupt the foot's ability to transition and may amplify shearing by providing a soft and instable support structure for the foot to press against for performing step and foundational functions.

SUMMARY

This disclosure describes footwear embodiments that allow for natural foot rotational movement while preventing undesirable foot rotational movement by incorporating a freely movable, sole that may shift within the footwear.

In various embodiments of the present disclosure, a footwear apparatus may include a primary outsole that may have a primary cavity. As used herein, "cavity" refers to any structure having a concave surface. A secondary outsole may be connected to the primary outsole. The secondary outsole may have a secondary cavity. A midsole may be movably disposed over the primary and secondary outsoles. The midsole may include a primary protrusion extending at least partially within the primary cavity. A tertiary outsole may be disposed about the primary protrusion. The footwear apparatus may define a z-axis through the secondary cavity and substantially normal to a ground surface. The apparatus may define a y-axis extending substantially from the secondary cavity to the primary cavity. An x-axis may be defined substantially normal to a plane created by the z-axis and the y-axis. The midsole may be configured to rotate substantially about the x-axis. The midsole may be configured to rotate substantially about the y-axis. The midsole may be configured to resist rotation substantially about the z-axis. A secondary protrusion may extend from the midsole and may extend at least partially into the secondary cavity. The primary protrusion, may have a first radius that is smaller than a second radius of the primary cavity. The secondary protrusion may have a third radius that is smaller than a fourth radius of the secondary cavity. One or more outsole ribs or like members may be disposed on atop portion of the secondary outsole and may extend radially outward from the secondary cavity. One or more midsole ribs or like members may be disposed on a bottom portion of the midsole. The midsole ribs may extend radially outward from the secondary protrusion. The midsole ribs may be disposed adjacent to the one or more outsole ribs. One or more outsole ribs or like members may be disposed on a top portion of the primary outsole and may extend radially outward from the primary cavity. One or more midsole ribs or like member may be disposed on a bottom portion of the midsole. The midsole ribs may extend radially outward from the primary protrusion. The midsole ribs may be disposed adjacent to the one or more outsole ribs. An elongate body may extend from the primary outsole to the secondary outsole. The primary outsole may be continuous with the elongate body. The elongate body may be continuous with the secondary outsole. A pair of outsole arms may extend from the primary outsole and may extend about the primary cavity. A pair of midsole arms may be disposed on a bottom portion of the midsole and may extend about the primary protrusion and substantially opposing the outsole arms. A material layer may be disposed between the primary protrusion and the primary cavity. A plurality of air pockets may be in the material layer. Each air pocket may be located substantially adjacent to a tuberosity of a fifth metatarsal, a fifth metatarsal head, and/or a first metatarsal head of a user's foot disposed on the midsole. The primary protrusion and the tertiary outsole may be positioned to avoid a fifth metatarsal of a user's foot disposed on the midsole. The midsole may be a portion of a high heel shoe, a boot, a prosthetic leg, a rehabilitation walking boot, a flat shoe, a robotic limb, an athletic shoe, a sporting cleat, a skate, a sneaker, or any other suitable footwear. A secondary outsole extension may be disposed on the secondary outsole and may extend substantially away from the primary outsole. Each of the primary outsole, the secondary outsole, and the tertiary outsole may contact a ground surface.

In another aspect, a footwear apparatus may include a posterior outsole portion. A cavity may be located in the posterior outsole portion. A midsole portion may be disposed on a top portion of the posterior outsole portion. The midsole portion may extend away from the posterior outsole portion. An anterior outsole portion may extend from a portion of the midsole portion. An elongate body may extend from the anterior outsole portion toward the posterior outsole portion. A protrusion may be disposed at an end of the elongate body. The protrusion may extend at least partially within the cavity. The footwear apparatus may define a z-axis through the cavity and may be substantially normal to a ground surface. A y-axis may extend substantially from the cavity through the elongate body. An x-axis may be substantially normal to a plane created by the z-axis and the y-axis. Each of the elongate body and the midsole portion may be configured to rotate about the x-axis. Each of the elongate body and the midsole portion may be configured to rotate about the y-axis. Each of the elongate body and the midsole portion may be configured to resist rotation about the z-axis. The protrusion may be a pin or a like member that is freely rotatable about the y-axis within the cavity. The pin may be reversibly engageable within the cavity about the x-axis. A pair of arms may extend from the elongate body about the anterior outsole portion.

In another aspect, a footwear apparatus may include a primary outsole comprising a first and a second primary arm. A secondary outsole may be connected to the primary outsole and may extend substantially away from the primary outsole. The secondary outsole may include a third and a fourth secondary arm. A midsole may be disposed over and may be connected to the primary outsole and the secondary outsole at a point. The footwear apparatus may define a z-axis through the point and may be substantially normal to a ground, surface. A y-axis may extend substantially along the midsole, the primary outsole, and the secondary outsole. An x-axis may be substantially normal to a plane created by the z-axis and the y-axis. The midsole may be configured to rotate about the x-axis and the y-axis and may resist rotation about the z-axis. One or more outsole ribs may be disposed on the secondary outsole and may extend radially outward from about the point. One or more midsole ribs may be disposed on a bottom portion of the midsole. The midsole ribs may extend radially outward from the point. The midsole ribs may be disposed adjacent to the one or more outsole ribs.

DETAILED DESCRIPTION

Figure 1:
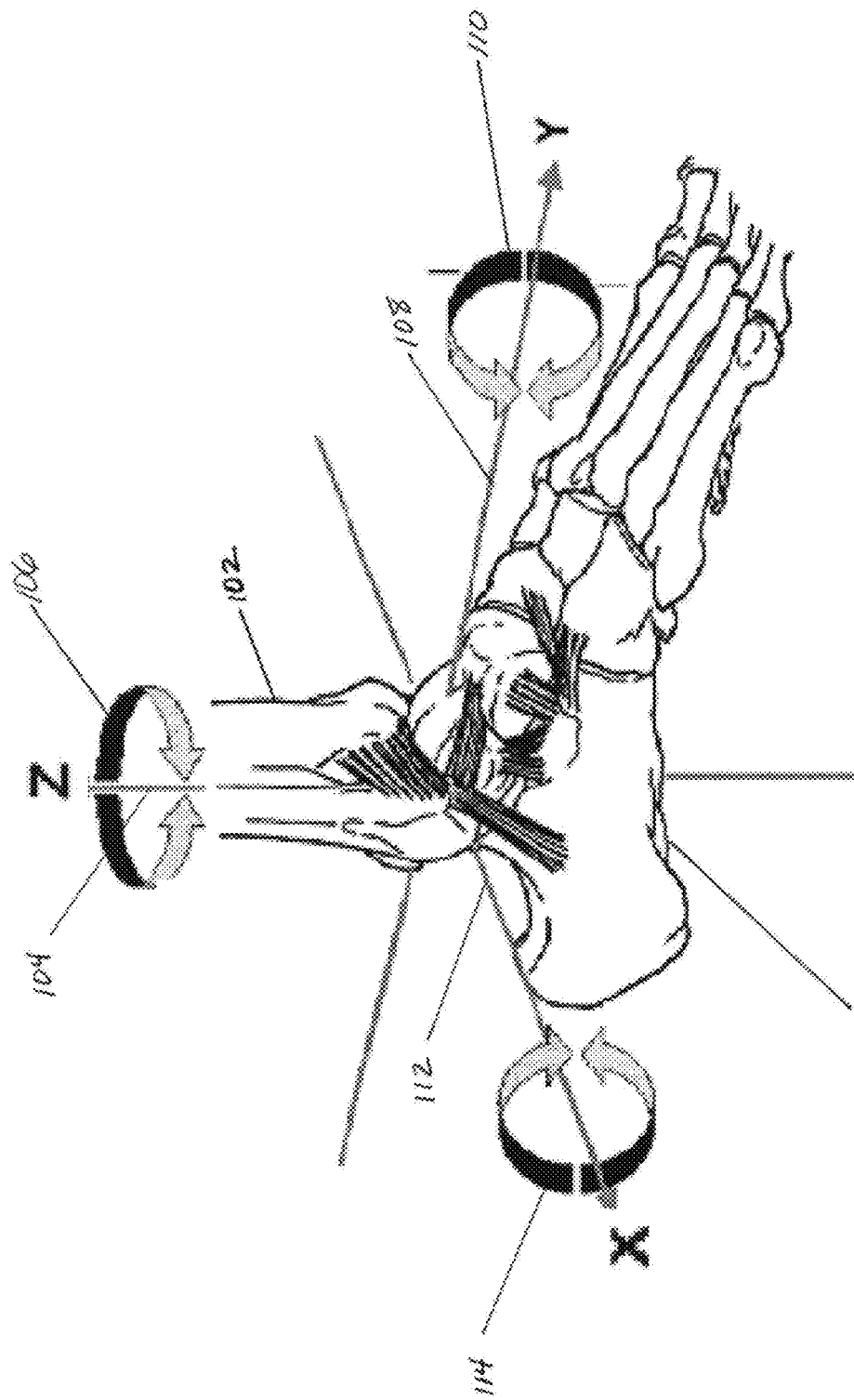
FIG. 1 illustrates a foot with a three-dimensional coordinate system.
Figure 2A:
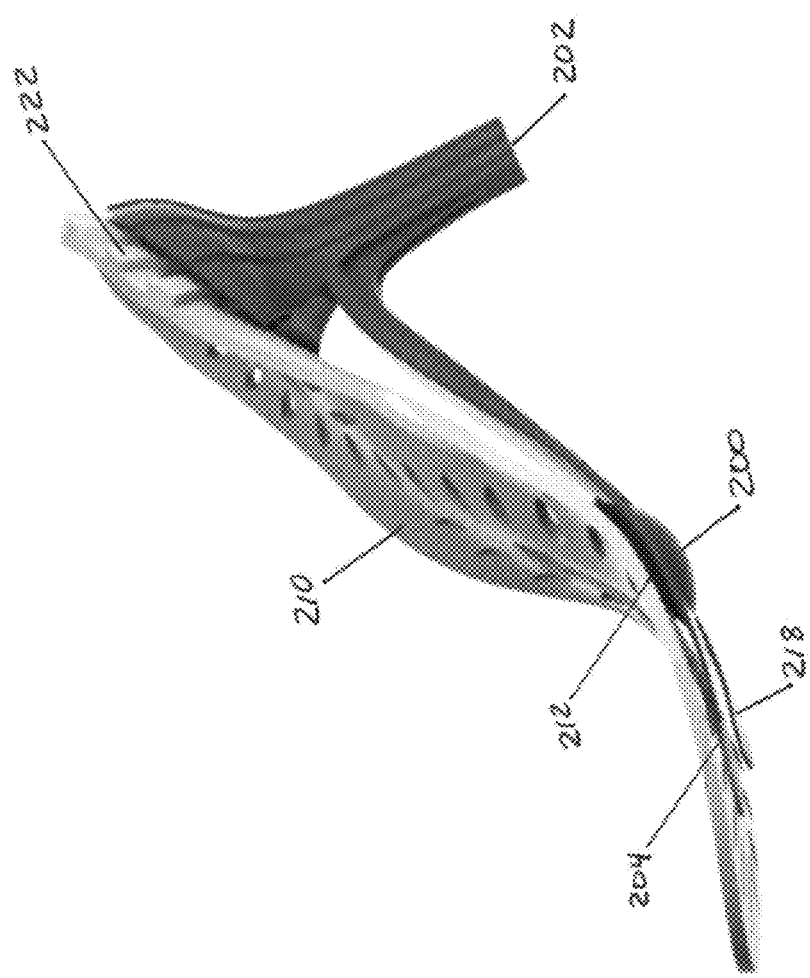
FIGS. 2A-2E illustrate a footwear device with a rotatable midsole, in accordance with an embodiment of the present disclosure.
Figure 2B:
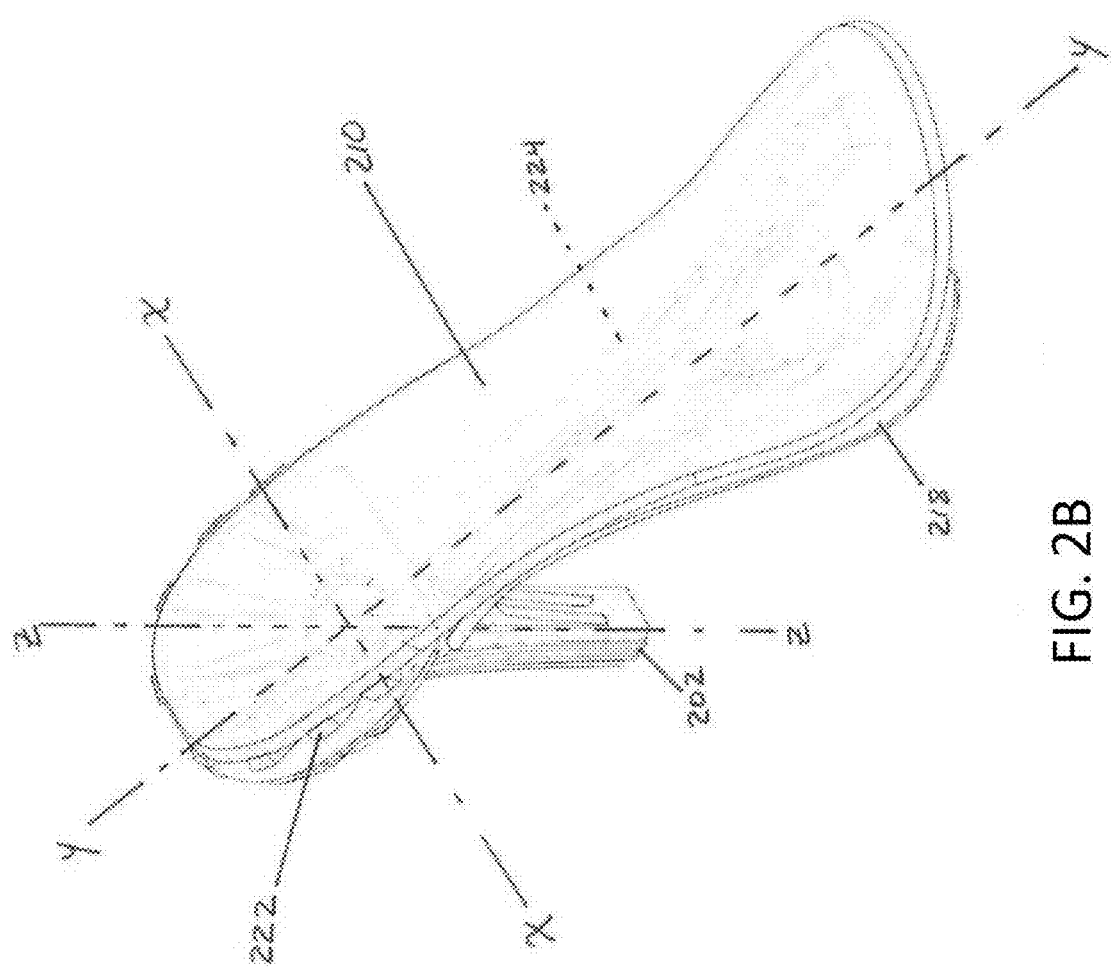
Figure 2C:
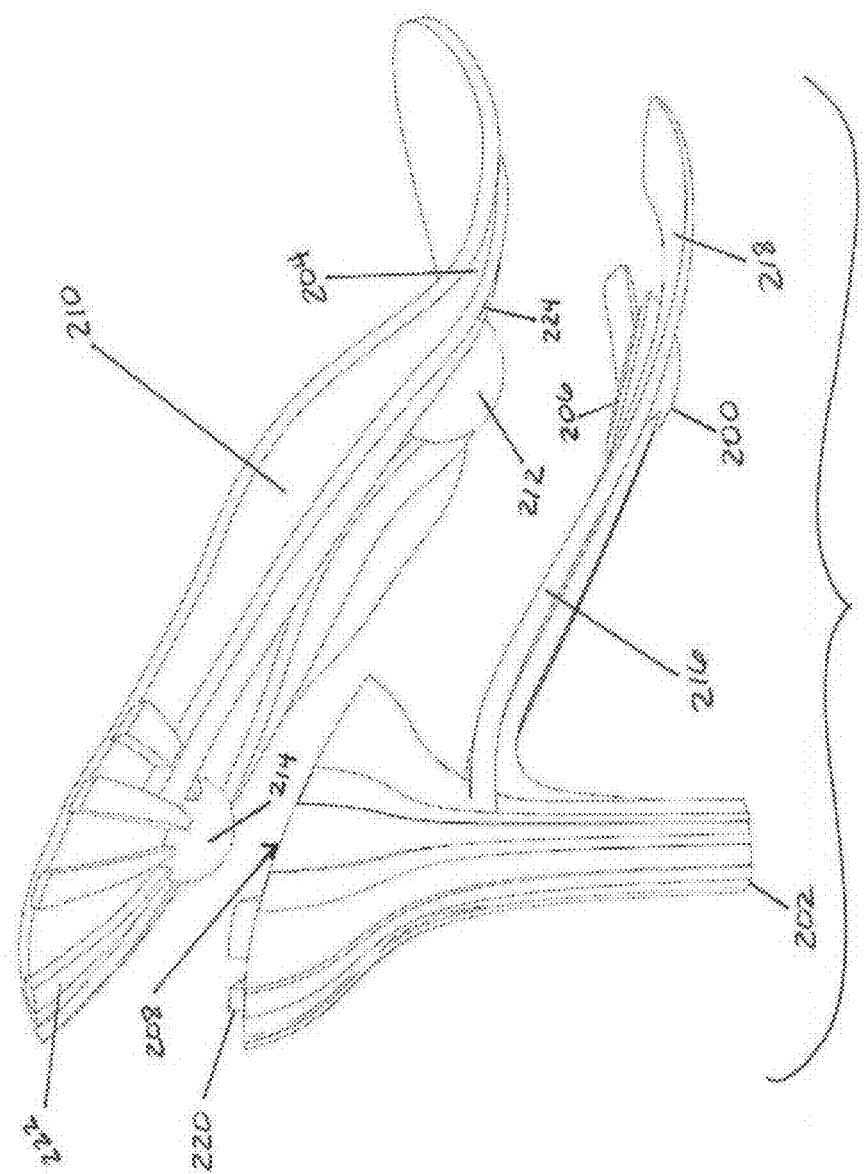
Figure 2D:
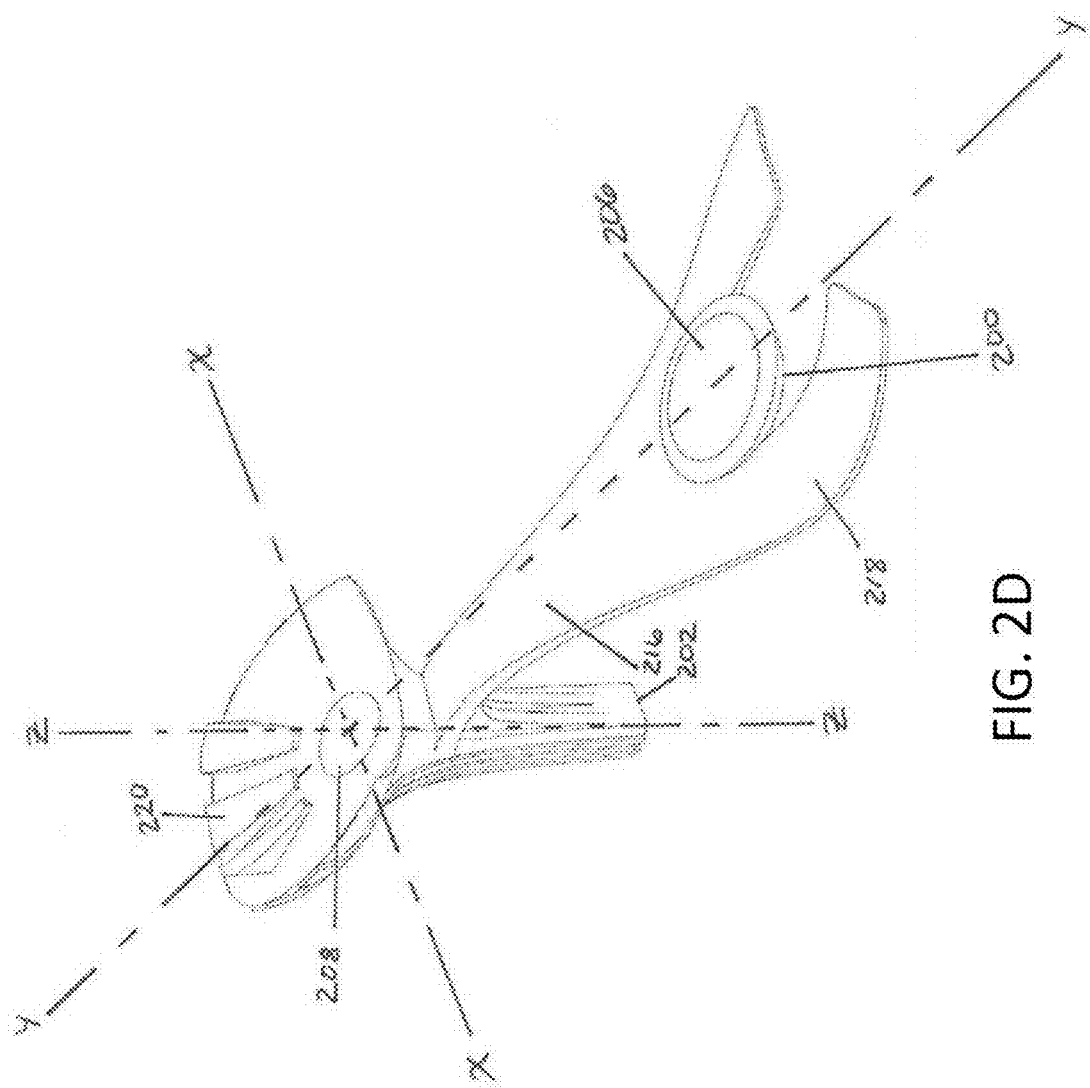
Figure 2E:
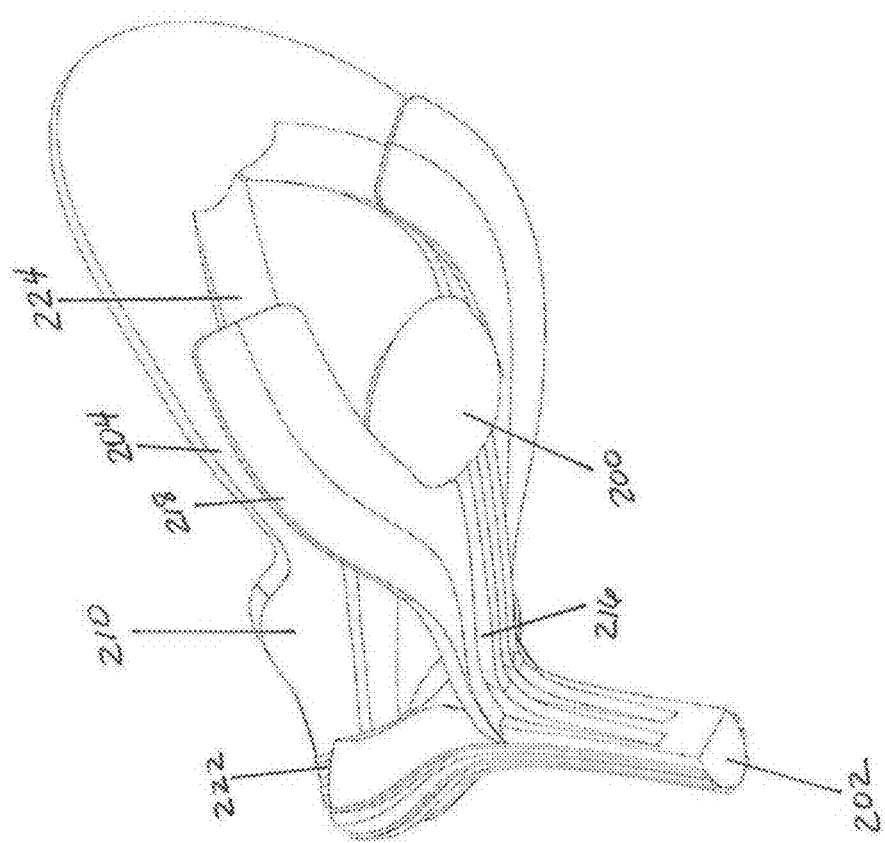

Footwear is generally designed for protection, traction, and for movement between the footwear and a ground surface as a wearer takes a step. However, such footwear may restrict the foot to the mold of the shoe and/or the sole(s), and, may allow for little to no movement of a midsole with respect to the outsole. A footwear device allowing midsole movement with respect to the outsole may assist a wearer's comfort, step efficiency, and lower-limb alignment health.

The inventor has found that allowing foot and/or midsole rotation within footwear about an, axis in a plane that is generally parallel, with the foot and/or ground surface is desirable, while rotation about an axis that is generally perpendicular to that plane is undesirable. Such undesirable rotation may be created, e.g., when a foot is traversing uneven terrain or when the body above the foot is rotating while keeping the foot fixed to the ground (e.g., turning the upper body to face and/or reach for something in a direction other than forward while leaving the feet fixed on the ground pointing in the forward direction). Such rotation may create undesirable shearing forces within the foot.

This disclosure focuses on a handful of discrete embodiments, with the intention of illustrating the principles of the systems and methods described. These descriptions are intended to be illustrative rather than limiting. Unless otherwise defined, all technical terms used herein have the same meaning as commonly understood by one of ordinary skill in the art to which the disclosure belongs.

As used herein, the term "insole" refers to a sole or a portion of a sole that interfaces with a foot. The term "midsole" refers to a sole or a portion of a sole having, structure for supporting the insole and/or interfacing with an outsole. The term "outsole" refers to a sole or a portion of a sole that interfaces with a ground surface. Portions of any one of these types of soles may function as another type of sole. For example, a midsole may have a surface that is an insole that interfaces with a foot, while also having a portion that is an outsole that in certain positions interfaces with a ground surface.

As used herein, the singular forms "a," "an," and "the" are intended to include the plural forms as well, unless the context clearly indicates otherwise. The terms "comprises" and/or "comprising," or "includes" and/or "including" when used herein, specify the presence of stated features, regions, steps elements and/or components, but do not preclude the presence or addition of one or more other features, regions, integers, steps, operations, elements, components and/or groups thereof. As used herein, the conjunction "and" includes each of the structures, components, features, or the like, which are so conjoined, unless the context clearly indicates otherwise, and the conjunction "or" includes one or the others of the structures, components, features, or the like, which are so conjoined, singly and in any combination and number, unless the context clearly indicates otherwise. The term "or" is generally employed in its sense including "and/or" unless the content clearly dictates otherwise.

All numeric values are herein assumed to be modified by the term "about," whether or not explicitly indicated. The term "about", in the context of numeric values, generally refers to a range of numbers that one of skill in the art would consider equivalent to the recited value (i.e., having the same function or result). In many instances, the term "about" may include numbers that are rounded to the nearest significant figure. Other uses of the term "about" (i.e., in a context other than numeric values) may be assumed to have their ordinary and customary definition(s), as understood from and consistent with the context of the specification, unless otherwise specified. The recitation of numerical ranges by endpoints includes all numbers within that range, including the endpoints (e.g. 1 to 5 includes 1, 1.5, 2, 2.75, 3, 3.80, 4, and 5).

It is noted that references in the specification to "an embodiment", "some embodiments", "other embodiments", "various embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effectuate such feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement and/or enrich the described embodiment(s), as would be understood by one of ordinary skill in the art.

Referring to FIG. 1, an illustrated foot 100 is oriented generally isometrically. A three-dimensional coordinate system is overlaid through the foot 100. A z-axis 104 extends through the foot, through the tibia 106, and generally perpendicular to a ground surface (not illustrated). A y-axis 108 extends through the z-axis 104 and extends along a length of the foot 100. The y-axis 108 may be generally perpendicular to the z-axis 104 when the foot 100 is positioned in a substantially flat position parallel with on resting on a ground surface. An x-axis 112 extends through the apex of the z-axis 104 and the y-axis 108 and extends generally perpendicular to a plane created by the z-axis 104 and the y-axis 108. A rotation about the z-axis 104 may describe, a motion of the body generally in the direction of the arrows 106. A rotation about the y-axis 108 may describe a motion of the body generally in the direction of the arrows 110. A rotation about the x-axis 112 may describe a motion of the body generally in the direction of the arrows 114.

As used herein, the term "z-axis rotation" or "z-rotation" are interchangeable and refer to a rotation substantially about a z-axis unless clearly stated otherwise. The same relationships apply with the terms "y-axis rotation", "y-rotation", "x-axis rotation", and "x-rotation" with respect to the y-axis and x-axis, respectively.

Rotation about an axis may not refer to just a rotation strictly about the axis, but also to simultaneous rotations about any another axis. Such axes defined throughout this disclosure may be repositioned as the insole, midsole, outsole, and/or foot move. For example, as the foot moves or a midsole is positioned such that it is not parallel with a ground surface, a y-axis may continue to extend along a foot, but the y-axis may no longer be substantially perpendicular to the z-axis. As a sole and/or a foot is positioned or moves, the axes move/re-orient along with the sole and/or foot.

Referring to FIGS. 2A-2E, an embodiment of a rotatable midsole ambulatory footwear device is, illustrated including a primary outsole 200 with a top side, a bottom side, a front end, and a back end. The footwear device further includes a secondary outsole 202 with a top end and a bottom end, and an elongate body 216 with a front end and a back end. The back end of the primary outsole 200 is connected to the secondary outsole 202 between the top and bottom ends of the secondary outsole 202. More specifically, the back end of the elongate body 216 is connected to the secondary outsole 202 between the top and bottom ends of the secondary outsole 202, and the primary outsole 200 is connected proximate to the front end of the elongate body 216. The primary outsole 200 has a primary cavity 206 at the top side and the front end of the primary outsole 200, and the secondary outsole 202 has a secondary cavity 208 at the top end of the secondary outsole 202. A midsole 210 is movably disposed over the top side of the primary outsole 200 and the top end of the secondary outsole 202. The midsole 210 includes a top side, a bottom side, a front end, and a back end. The midsole 210 further includes a primary protrusion 212 proximate to the front end that protrudes away from the bottom side of the midsole 210. The primary protrusion 212 extends at least partially within the primary cavity 206 when the bottom side of the midsole 210 engages the top end of the secondary outsole 202. The primary protrusion 212 has a radius that is substantially the same as, or smaller than, a radius of the primary cavity 206. The midsole 210 also includes a secondary protrusion 214 proximate to the back end of the midsole 210 that protrudes away from the bottom side of the midsole 210. The secondary protrusion 214 extends at least partially into the secondary cavity 208 when the bottom side of the midsole 210 engages the top side of the primary outsole 200. The secondary protrusion 214 has a radius that is substantially the same as, or smaller than, a radius of the secondary cavity 208. The protrusions 212, 214 may extend partially into the cavities 206, 208 when no weight, and/or force, is placed on the midsole 210. The protrusions 212, 214 may extend more substantially into the cavities 206, 208 when weight and/or force is applied to the midsole 210. The device defines a z-axis Z through the secondary cavity 208 and substantially normal to a ground surface, a y-axis Y extending substantially from the secondary cavity 208 to the primary cavity 206, and an x-axis X substantially normal to a plane created by the z-axis Z and the y-axis Y. The midsole 210 includes a tertiary outsole 204 portion at the front end of the midsole 210 and about either side of the primary protrusion 212 positioned radially from the y-axis Y. One or more outsole arms 218 extend from the elongate body 216 at the front end of the elongate body 216 and extends about the primary cavity 206 such that the arms 218 are positioned radially from the y-axis Y. The bottom side of the midsole 210 includes one or more midsole arms 224 at the front end of the midsole 210 that extend along the bottom side of the midsole 210 and extend about the primary protrusion 212. The midsole arms 224 reside above the top side of the outsole arms 218. Outsole ribs 220 are disposed on the top end of the secondary outsole 202. The outsole ribs 220 extend radially outward from the secondary cavity 208 and increase in height as the outsole ribs 220 extend radially outward away from the secondary cavity 208. Midsole ribs 222 are disposed on the bottom side and the back end of the midsole 210. In this embodiment, the midsole ribs 222 extend radially outward from the secondary protrusion 214. The central midsole ribs 222 are disposed adjacent to and between the outsole ribs 220, and may or may not make contact with the outsole ribs 220 when there is no midsole 210 rotation. The interaction between the midsole ribs 222 and outsole ribs 220 provide a means to substantially prevent rotation of a wearer's foot about the z-axis Z (as shown in FIG. 1), but does not prevent rotation in about the X or Y axes.

Figure 3A:
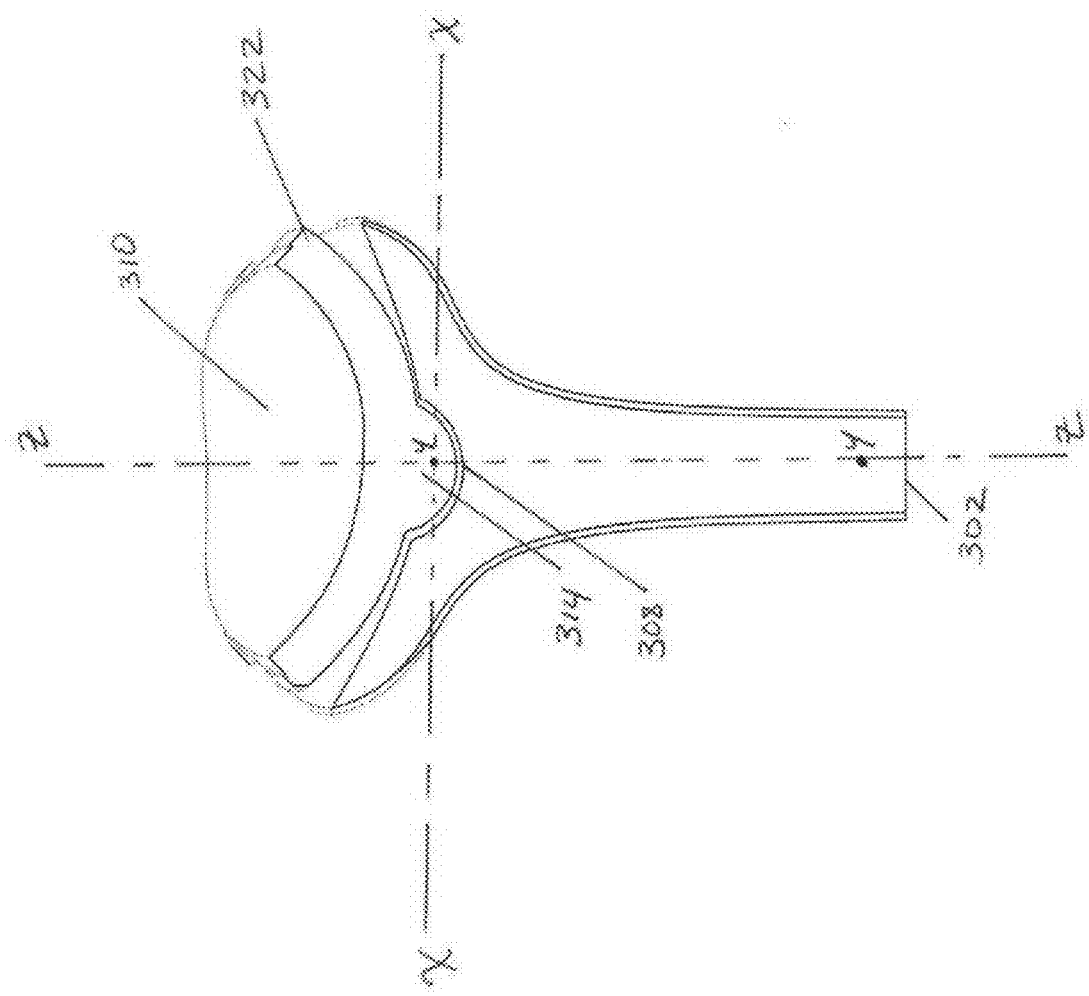
FIGS. 3A and 3B illustrate cross sections of a footwear device across a y-axis at a secondary cavity and at a primary cavity respectively with a rotatable midsole, in accordance with an embodiment of the present disclosure.
Figure 3B:
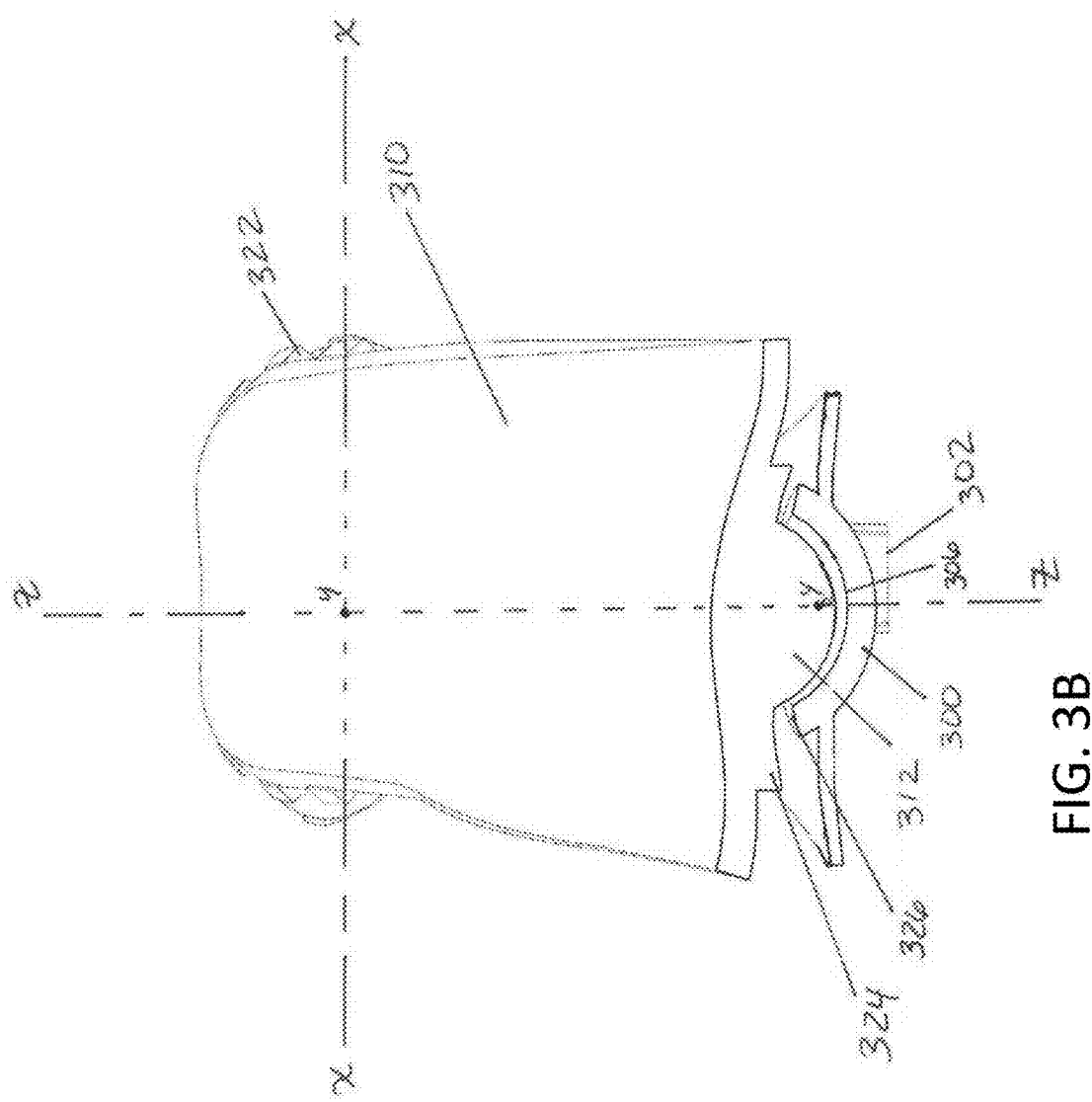

Referring to FIGS. 3A and 3B, an embodiment of a rotatable midsole ambulatory footwear device is illustrated including a primary protrusion 312 and a secondary protrusion 314 of a midsole 310 within a primary cavity 306 of a primary sole 300 and a secondary cavity 308 of a secondary sole 302, respectively. The protrusions 312, 314 are free to rotate and/or slide about the x-axis X and/or the y-axis Y (substantially perpendicular to these cross-sectional views). The midsole ribs 322 may interact with outsole ribs to restrict over-rotation about the x-axis or y-axis by contacting the top portion of the secondary sole 302. Additionally, the midsole arms 324 and/or the lip 326 prevent over-rotation of the midsole 310 about the x-axis X or y-axis Y by a midsole arm 324 contacting and stopping at the lip 326. The rotation of midsole 310 about the z-axis Z is substantially prevented by the adjacency of the midsole ribs 322 with the outsole ribs. A rotation about the z-axis Z will be substantially prevented by the midsole ribs 322 coming into contact with and stopping at the outsole ribs.

In various embodiments of this disclosure, a midsole is able to rotate about x-axis and/or about a y-axis with respect to a primary and secondary outsole. The midsole may rotate (e.g., "rock") about the y-axis via rotation of the protrusions within the cavities and the ribs rocking along the top portion of a secondary sole. The midsole may also rotate about the x-axis by the protrusions sliding within the cavities such that the primary protrusion slides slightly towards the secondary cavity in one rotational direction about the x-axis, and the secondary protrusion slides slightly towards the primary cavity in an opposite direction about the x-axis. A midsole is substantially prevented from rotating about a z-axis by the adjacency and interaction of the complementary ribs (or other similar protrusions or means) on the midsole and outsole. For example, when a rotational movement is made, about the z-axis, the midsole and outsole ribs or other similar means make contact with each other and prevent further rotation.

In various embodiments, a tertiary outsole of a midsole may interact with a ground surface when the midsole is rotated about the x-axis and/or the y-axis and/or the ground surface slopes or is otherwise brought closer to one or more portions of the tertiary outsole. In addition to the primary and secondary outsoles, the tertiary outsole contacting the ground surface may assist a user in providing a third contacting point with the ground, surface to perform the S-shape pathway of a step. Additionally, or in the alternative, the tertiary outsole may make contact with an outsole arm.

Figure 4A:
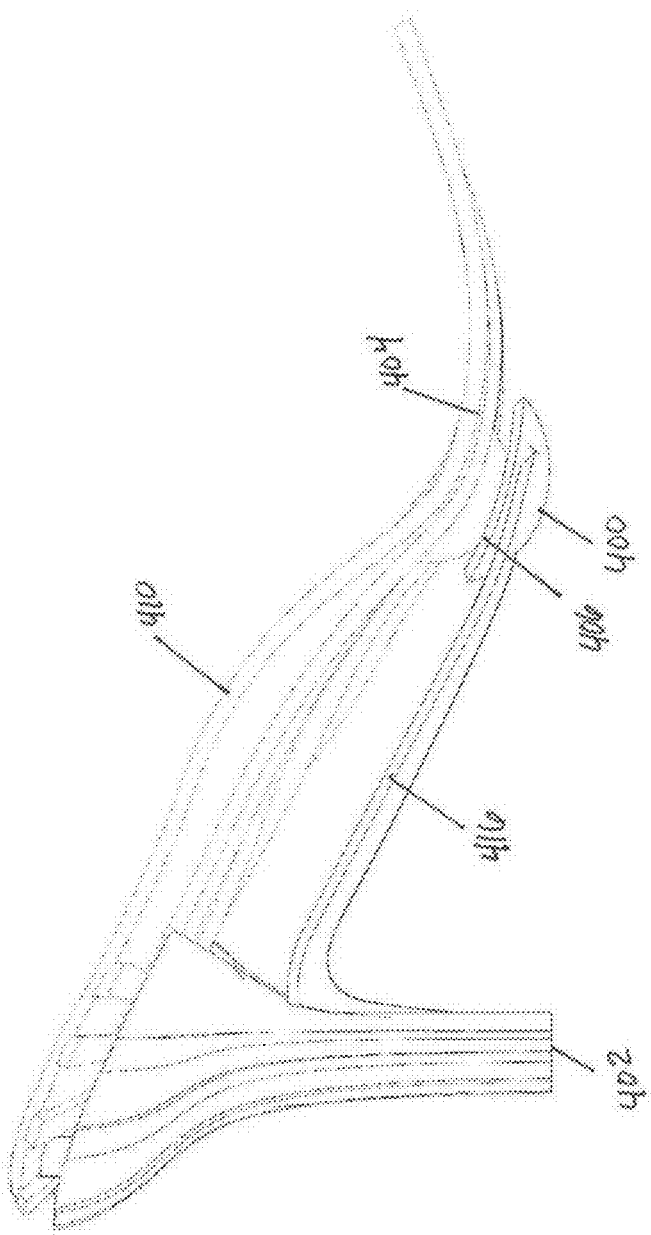
FIGS. 4A and 4B illustrate a footwear device with a rotatable midsole, in accordance with an embodiment of the present disclosure.
Figure 4B:
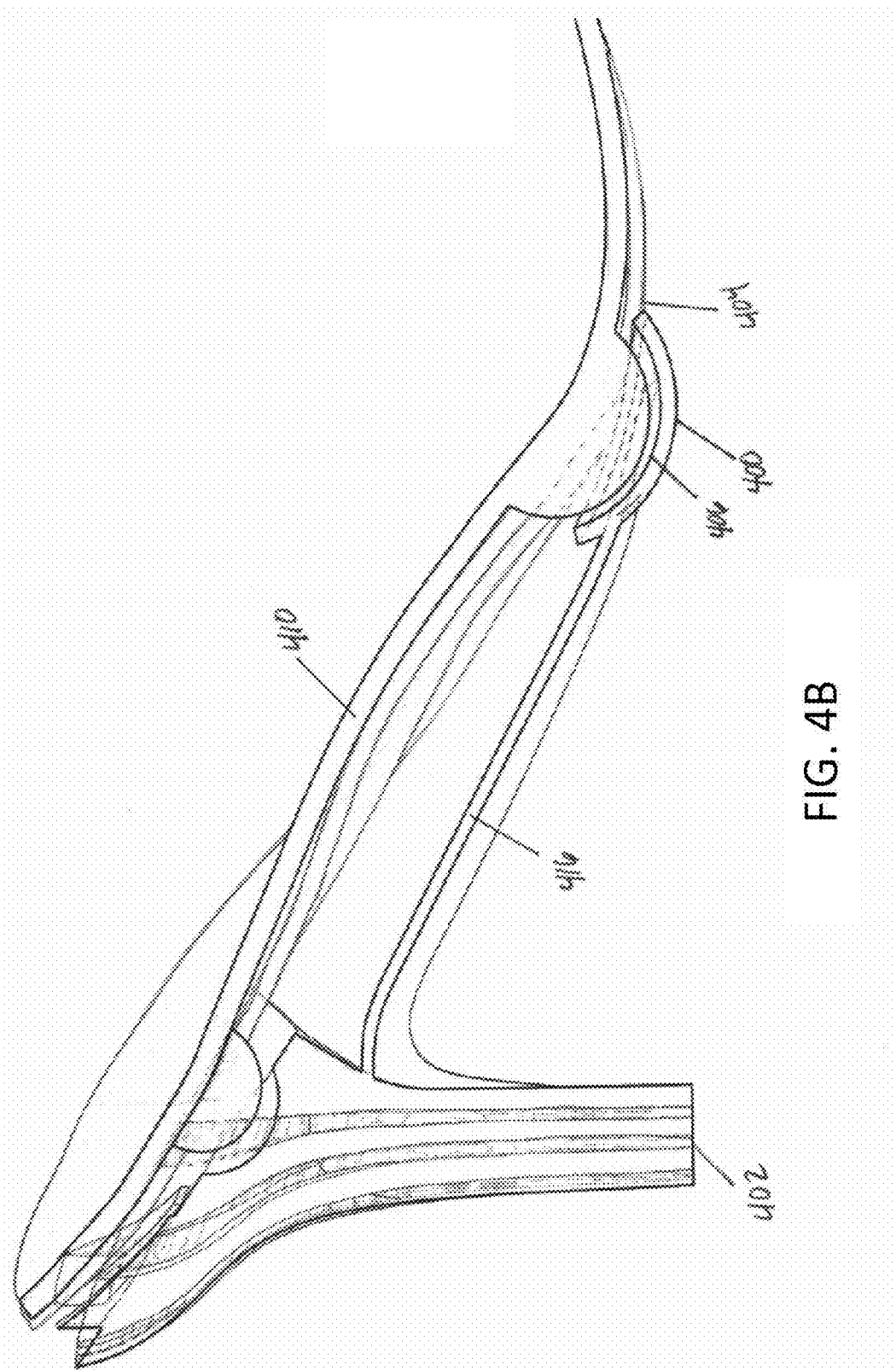
Figure 5:
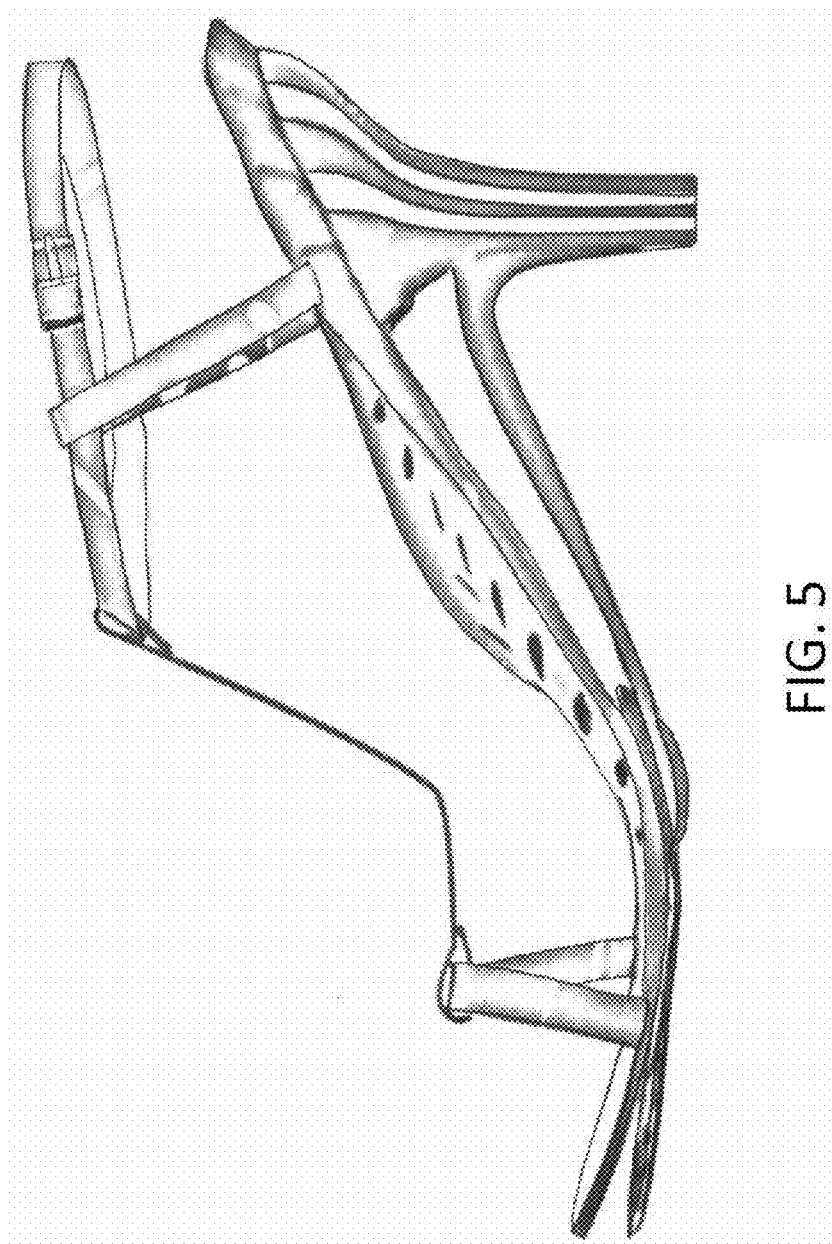
FIG. 5 illustrates a footwear device with a rotatable midsole, in accordance with an embodiment of the present disclosure.

Referring to FIGS. 4A and 4B, an embodiment of a rotatable midsole ambulatory footwear device is illustrated including a primary outsole 400 without outsole arms extending from the elongate body 416 and about the primary cavity 406. This embodiment includes a smaller primary outsole 400 point of contact, allowing for a larger portion of the tertiary outsole 404 of the midsole 410 to make contact with the ground surface when rotated. Three points of ground contact may be established with the primary outsole 400, secondary outsole 402, and the tertiary outsole 404.

Figure 6:
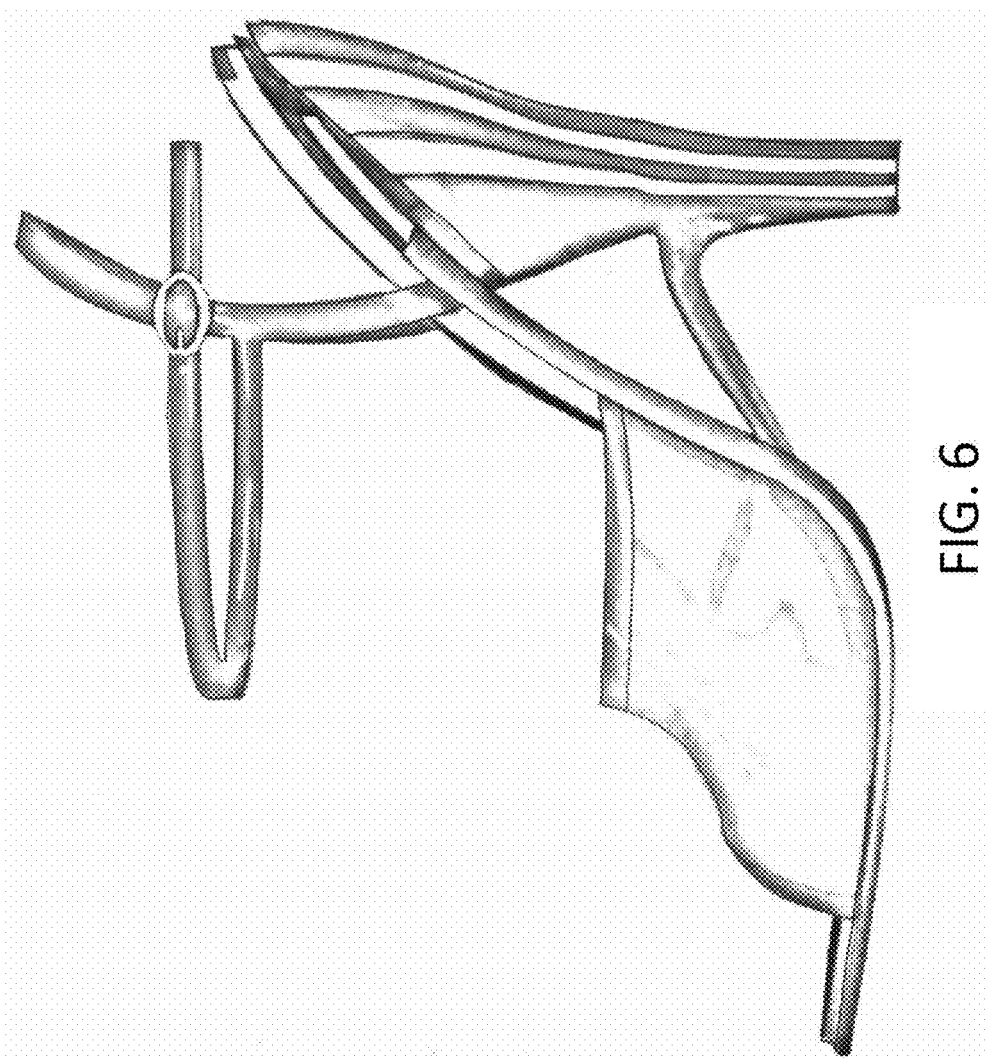
FIG. 6 illustrates a footwear device with a rotatable midsole, in accordance with an embodiment of the present disclosure.
Figure 7:
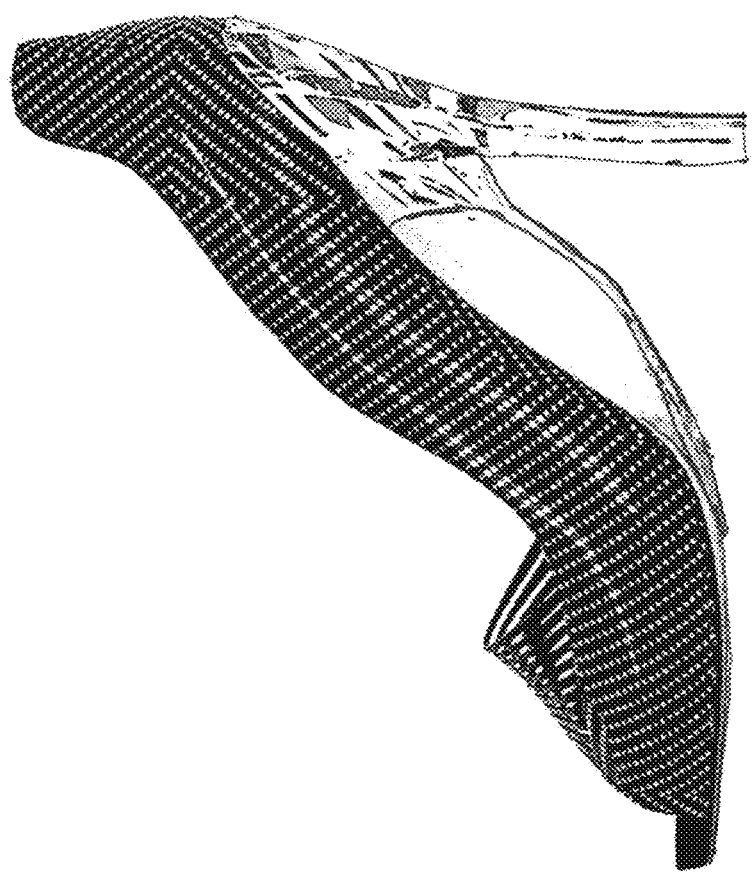
FIG. 7 illustrates a footwear device with a rotatable midsole, in accordance with an embodiment of the present disclosure.
Figure 8:
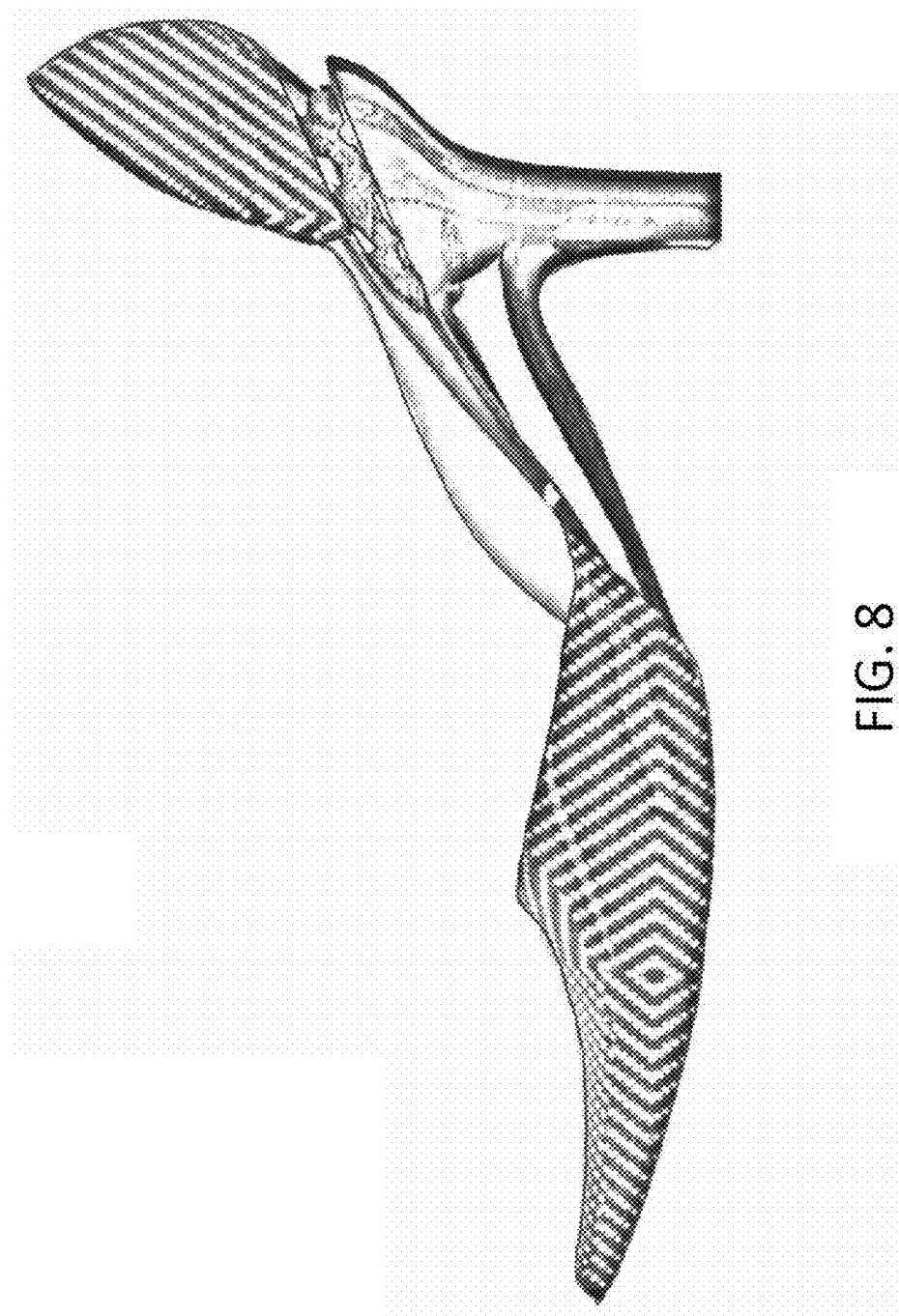
FIG. 8 illustrates a footwear device with a rotatable midsole, in accordance with an embodiment of the present disclosure.
Figure 9:
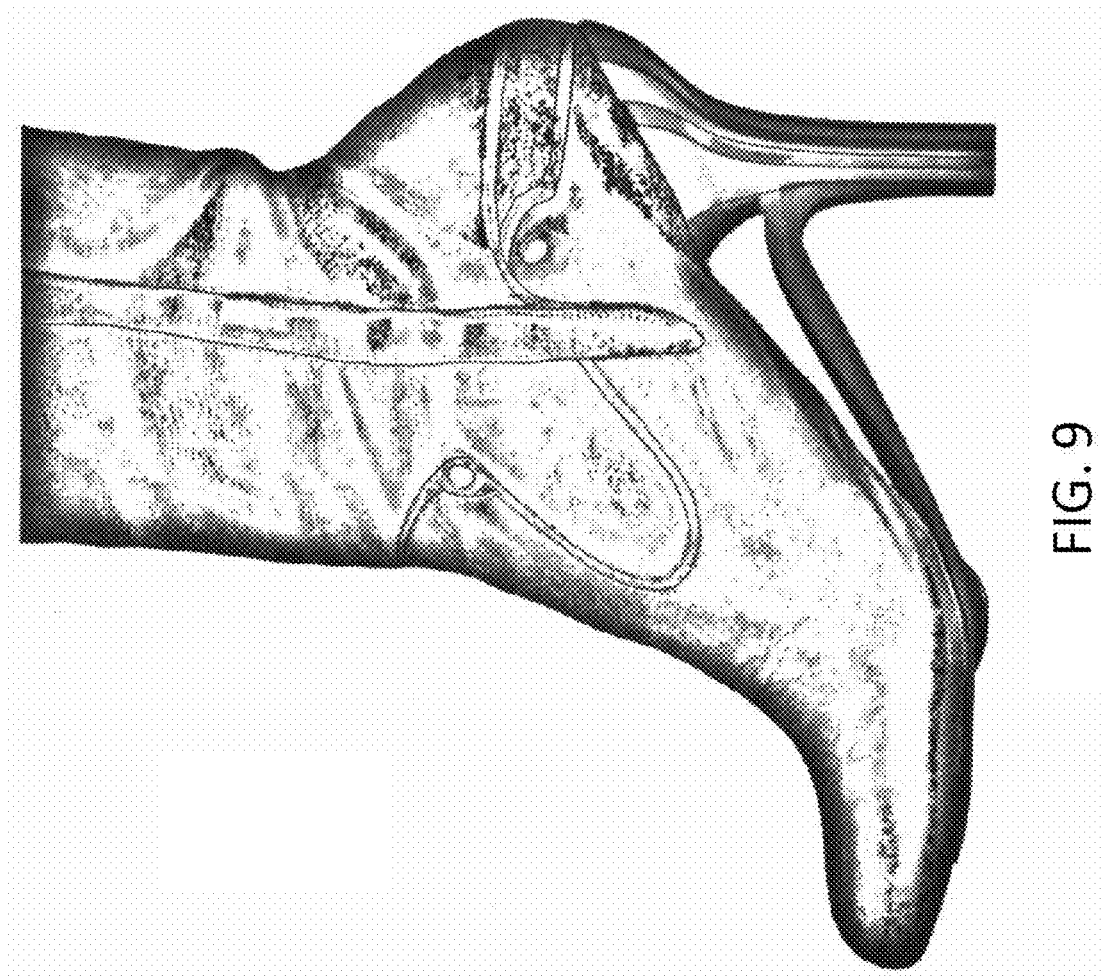
FIG. 9 illustrates a footwear device with a rotatable midsole, in accordance with an embodiment of the present disclosure.
Figure 10:
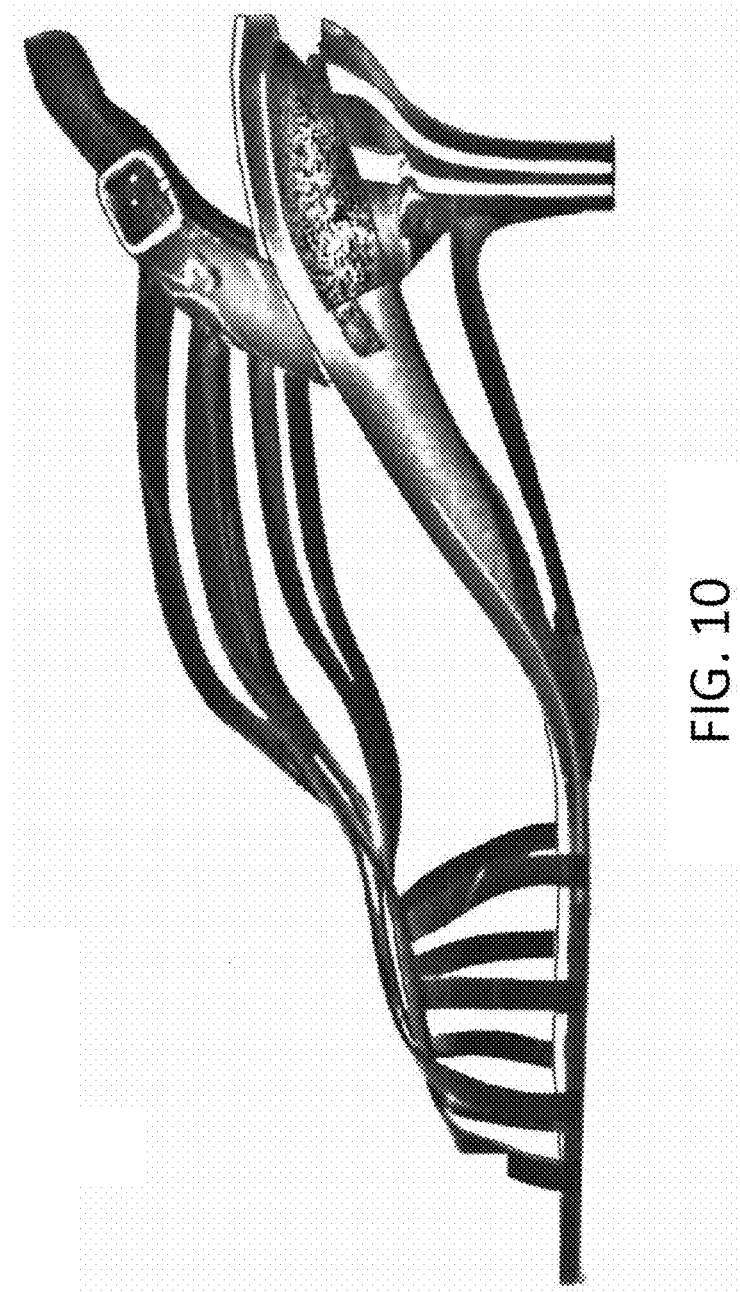
FIG. 10 illustrates a footwear device with a rotatable midsole, in accordance with an embodiment of the present disclosure.
Figure 11:
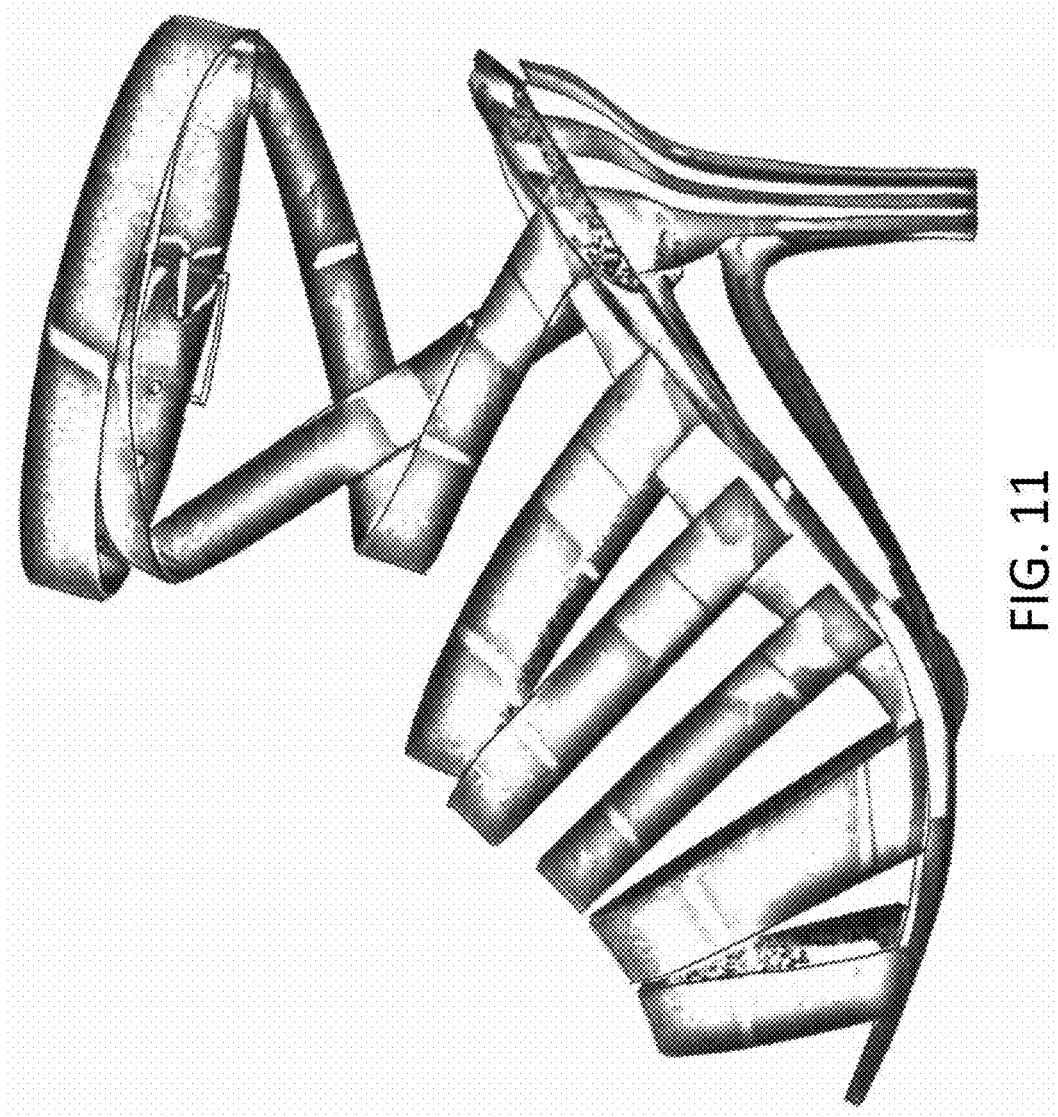
FIG. 11 illustrates a footwear device with a rotatable midsole, in accordance with an embodiment of the present disclosure.
Figure 12:
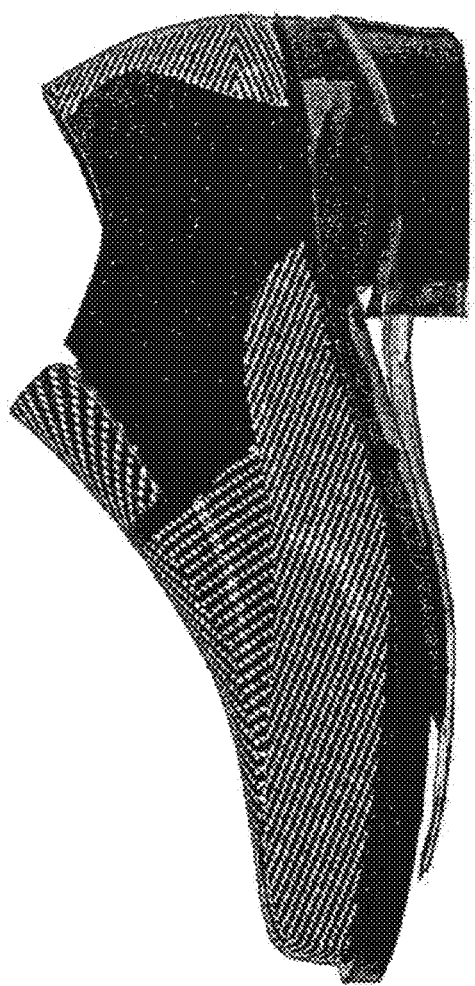
FIG. 12 illustrates a footwear device with a rotatable midsole, in accordance with an embodiment of the present disclosure.

Referring to FIGS. 5-12, various embodiments of a rotatable midsole ambulatory footwear device are illustrated that include a midsole that is part of or integrated with an insole and other material to wrap about a foot for the function of holding the soles to the foot and/or for fashionable appeal. A pitch angle of a y-axis extending through the primary cavity and secondary cavity may be steepened with respect to a ground surface in order to fit with the shape of the midsole. For example, the y-axis extending through the cavities of the footwear of FIG. 6 is steeper than that of the footwear of FIG. 12. With the adjustment of the pitch and length of the y-axis between and through the cavities, the top portion of the secondary outsole, the outsole ribs, and the midsole ribs may be extended or shortened to interface with the midsole. In addition to the footwear styles, illustrated, various other footwear for ground-contacting limbs may be applied to or integrated with a midsole such as, for example, a high heel, a boot, a cleat, a prosthetic leg, a flat or other shoe, a robotic limb, a sneaker, an ambulatory cast, an athletic shoe, or the like.

In various embodiments, a midsole may be attached to an outsole. The midsole and outsole may be attached to each other via a flexible foam layer and/or flexible glue between the two. Additionally, or in the alternative, an elastomer thermoplastic polyurethane, thermoplastic rubber, ethylene-vinyl acetate, or the like may be disposed between a midsole and an outsole (e.g., at least between the midsole ribs and outsole ribs). Such, materials between the midsole and outsole may leave open air pockets or an open-air layer between or within the materials to allow for additional compression from the weight and/or force of a user's foot. Additionally, or in the alternative, the midsole may be over-molded or co-molded onto the outsole, e.g., a molded rigid outsole may have a midsole injection molded about the outsole such that the midsole is generally adhered to the outsole while still remaining rotatable with respect to the outsole. The molded outsole may include poles, dowels, pins, lugs, trusses, teeth or the like on the upper portions of the outsole for the midsole to permanently or reversibly attach to via, e.g., complementary cavities or holes in the midsole to interact with these outsole features. A midsole may be reversibly attached to the outsole by using these features such that a midsole may reversibly "snap on" and "snap off" of an outsole to interchange the midsole or outsole for function and or fashion. In various embodiments, outsole portions may comprise of rubber, polymers, carbon fiber, plastics, a combination of these, or the like.

Figure 13A:
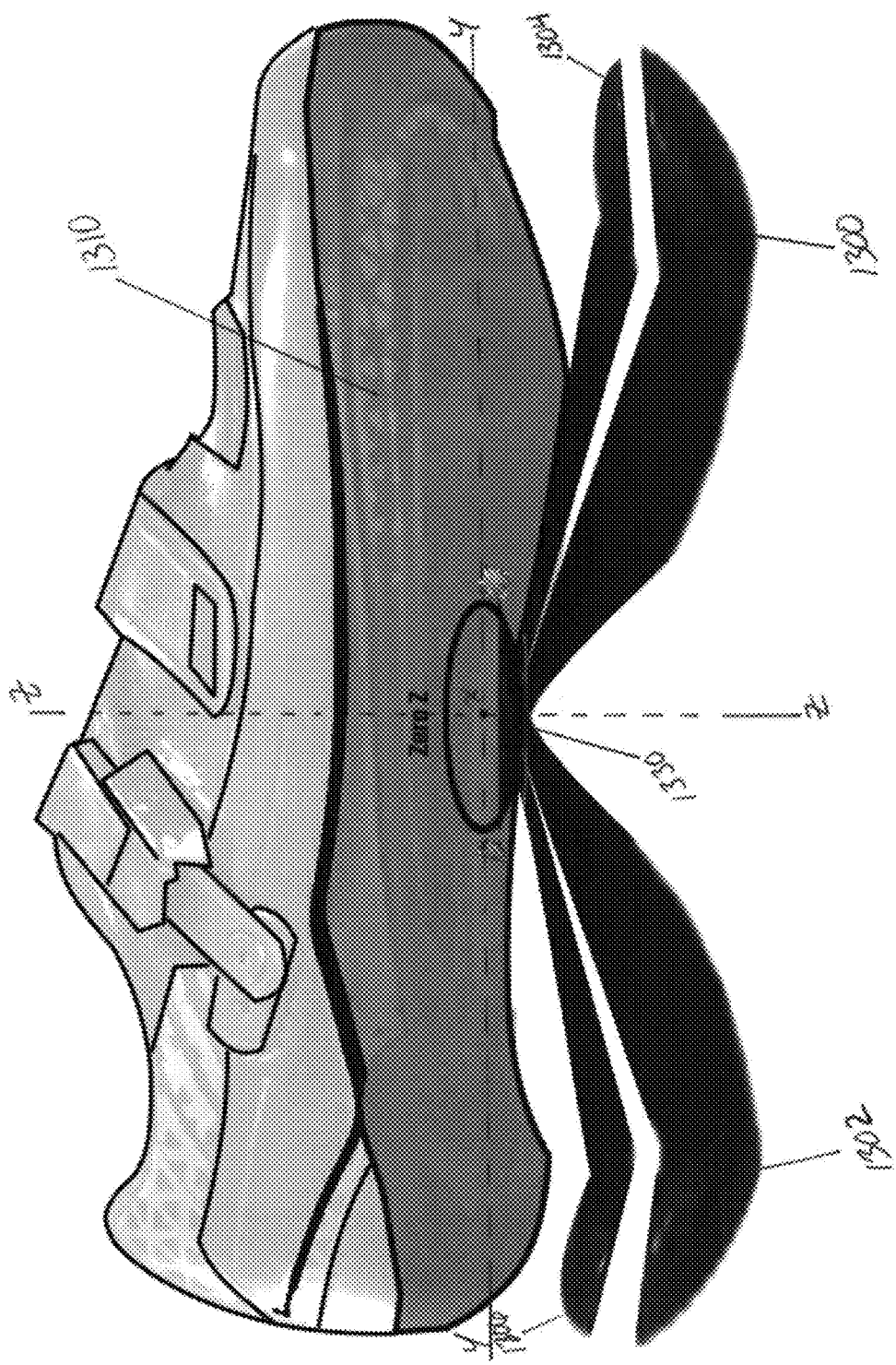
FIGS. 13A and 13B illustrate a footwear device with a rotatable midsole having anterior and, posterior outsole arms, in accordance with an embodiment of the present disclosure.
Figure 13B:
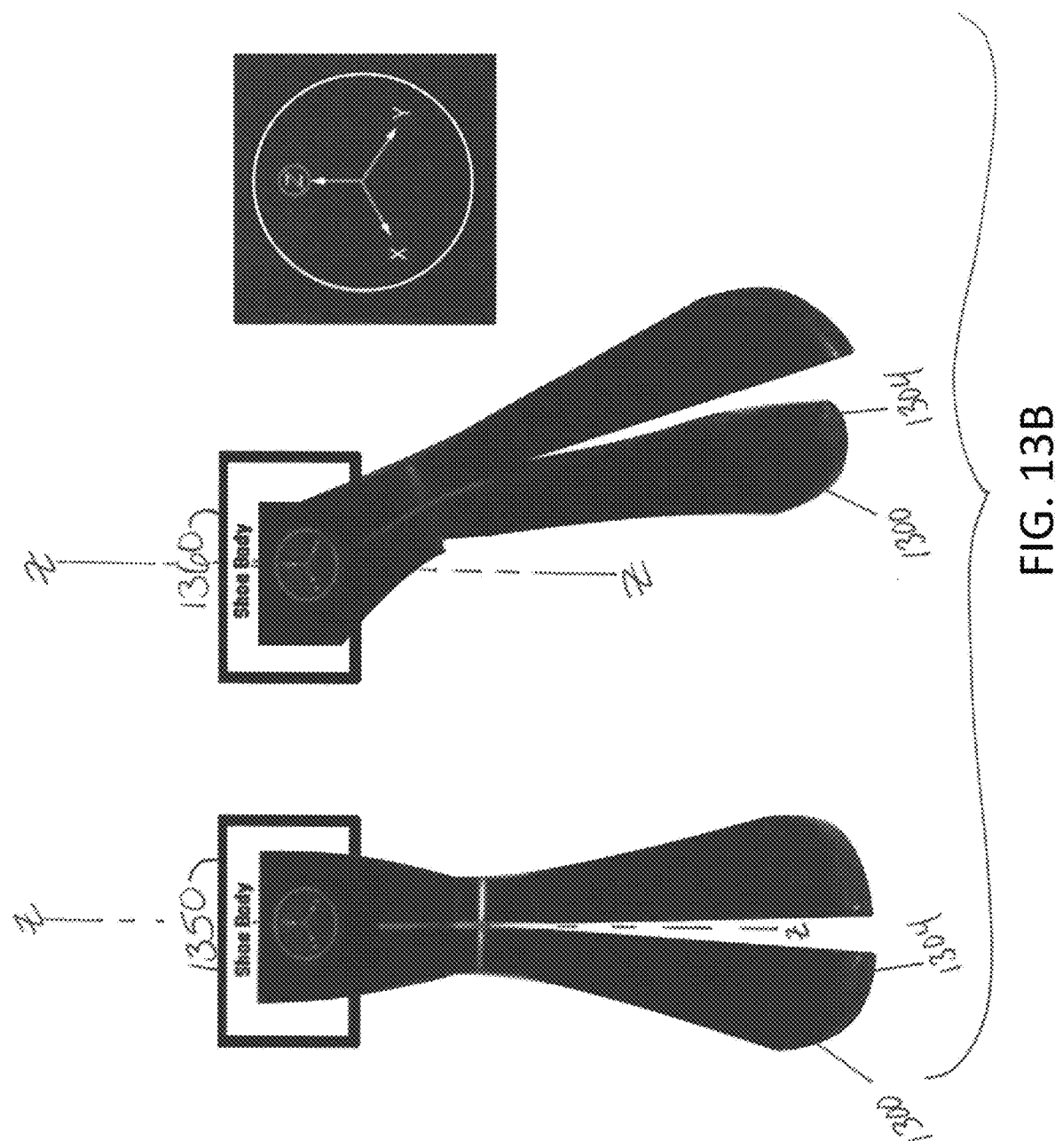

Referring to FIGS. 13A and 13B, an embodiment of a rotatable midsole ambulatory footwear device is illustrated including a rigid primary outsole 1300 having primary arms 1304 and a rigid secondary outsole 1302 having secondary arms 1306. Although two arms are illustrated for each of the primary and secondary arms 1304, 1306, it should be understood that any number of arms 1304, 1306 may be implemented. For example, additional arms may allow for additional flexibility when interfacing at an angle with a ground surface. The midsole 1310 is disposed over and connected to the primary outsole 1300 and the secondary outsole 1302 at a point 1330. The footwear apparatus defines a z-axis Z through the point 1330 and substantially normal to a ground surface. A y-axis Y extends through the point 1330, substantially along the midsole 1310, the primary outsole 1300, and the secondary outsole 1302. The point 1330 may include a protrusion that interacts with a cavity of the primary outsole and secondary outsole, similar to that of the protrusion 214 and the cavity 208 of FIG. 2C. Midsole ribs and outsole ribs may be disposed about the protrusion of, the point 1330 to assist with, substantially limiting z-rotation. An x-axis X is substantially normal to a plane created by the z-axis Z and the y-axis Y. The two arms 1304 of the primary outsole 1300 and the two arms 1306 of the secondary outsole 1302 may spread apart from each other in the tilted position 1360 (compared to the upright position 1350) along (not about) the z-axis Z. In this way, the arms 1304, 1306 may make an additional point of contact with the tilted ground surface. One or more outsole ribs may be disposed on the secondary outsole 1302 that may extend radially outward from about the point 1330. Additionally, one or more midsole ribs maybe disposed on a bottom portion of the midsole 1310 extending radially outward from the point 1330. The midsole ribs may be adjacent to the one or more outsole ribs. The midsole may include a tertiary outsole that interacts with a ground surface during rotations.

Figure 14:
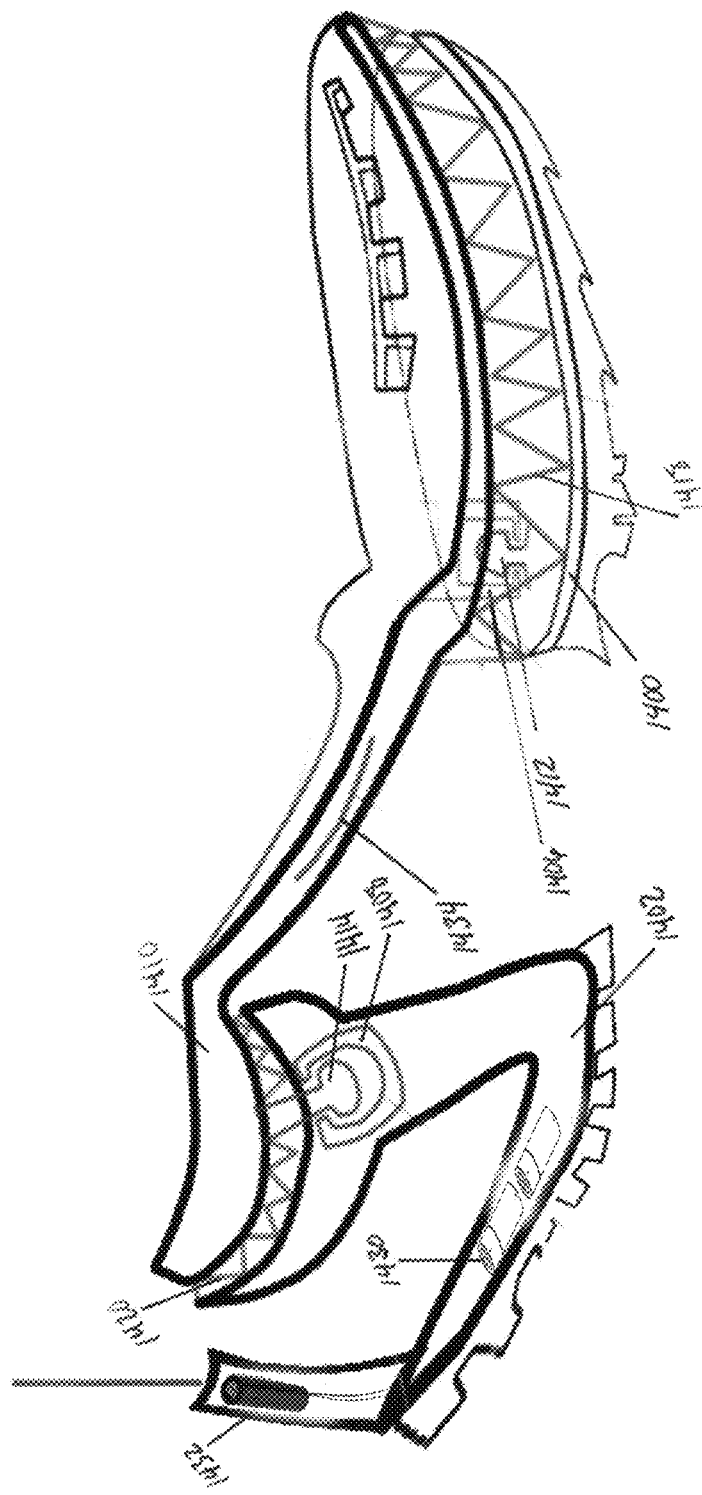
FIG. 14 illustrates a footwear device with a rotatable midsole, in accordance with an embodiment of the present disclosure.

Referring to FIG. 14, an embodiment of a rotatable midsole ambulatory footwear device is illustrated including a midsole 1410 disposed over a primary outsole 1400 and a secondary outsole 1402. The midsole 1410 includes a primary cavity 1406 and a secondary protrusion 1414. A primary protrusion 1412 extending from the primary outsole 1400 extends at least partially into the primary cavity 1406. The secondary protrusion 1414 extends at least partially into a secondary cavity 1408 in the secondary outsole 1402. The midsole 1410 is moveable with respect to the outsoles 1400, 1402 via the protrusions 1412, 1414 and cavities 1406, 1408. A flexible material 1420 between the midsole 1410 and the outsoles 1400, 1402 fills in the space between the soles while still permitting movement of the soles. The secondary outsole 1402 has an extension 1430 that extends in a substantially posterior direction with an upward curve such that when a wearer takes a running step that would naturally involve a back edge of the naked heel to contact the ground first, instead a larger amount of surface area of the extension 1430 can interface with the ground. Lights, e.g., in the form of, a laser 1432, may be disposed on the extension 1430. A battery for the laser 1432 may be housed within the extension 1430. The laser 1432 may be oriented in a multitude of directions, e.g., up at the wearer, out over a crowd from a staged, position of the wearer, or the like. The midsole 1410 may include a suspension portion 1434 that comprises a different material or a lack of any material at all (i.e., a pocket) that may align with portions of a foot of the wearer (e.g., the tuberosity of the fifth metatarsal). The extension 1430 may comprise a multitude of shapes including, e.g., an ellipsoid, a square, a trapezoid, a stemmed wine glass, tree roots, a combination thereof, or the like.

Figure 15:
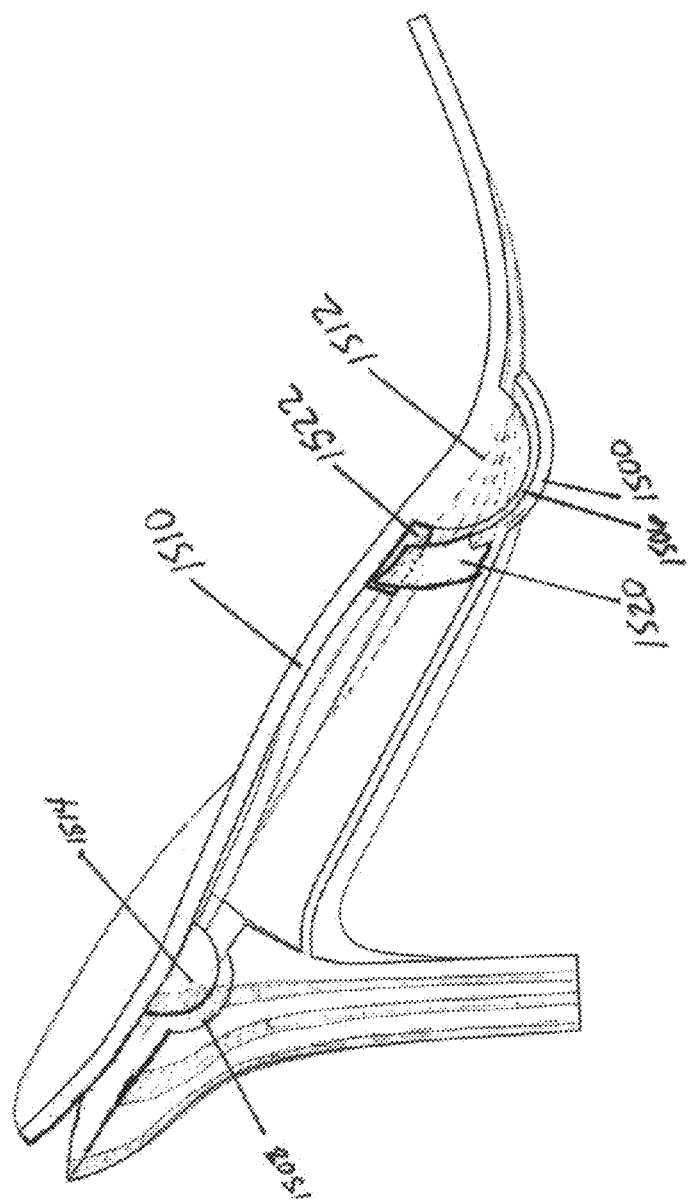
FIG. 15 illustrates a footwear device with a rotatable midsole, in accordance with an embodiment of the present disclosure.

Referring to FIG. 15, an embodiment of a rotatable midsole ambulatory footwear device is illustrated including a primary outsole 1500 having an outsole rib 1520 about the primary cavity 1506. This outsole rib 1520 is about the primary protrusion 1512 and is adjacent to a midsole rib 1522 of the midsole 1510. These ribs 1520, 1522 are in alternative to ribs that may be disposed about the secondary cavity 1508 and the secondary protrusion 1514, however, these ribs 1520, 1522 may be in addition to ribs about the secondary cavity 1508 and secondary protrusion 1514. The relationship between these midsole ribs 1522 and outsole ribs 1520 functions similarly to midsole ribs and outsole ribs described herein.

Figure 16:
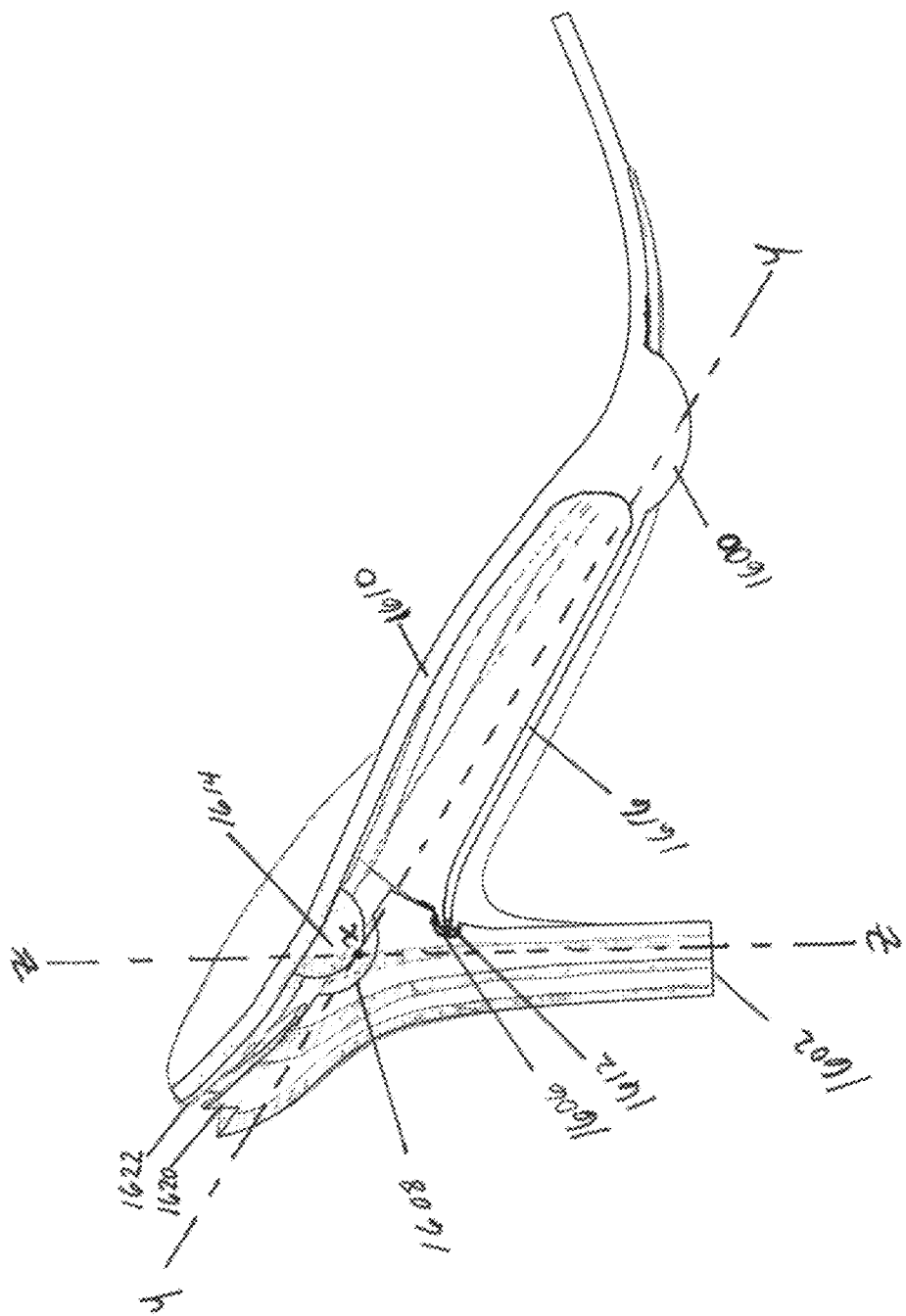
FIG. 16 illustrates a footwear device with a rotatable midsole, in accordance with an embodiment of the present disclosure.

Referring to FIG. 16, an embodiment of a rotatable midsole ambulatory footwear device is illustrated including a secondary outsole 1602 having a primary cavity 1606 at a side portion and a secondary cavity 1608 at a top portion. A midsole 1610 is disposed over the secondary outsole 1602. A secondary protrusion 1614 extends from the midsole 1610 at least partially into the secondary cavity 1608. The midsole 1610 extends to and is continuous with a primary outsole 1600. An elongate body 1616 extends from the primary outsole 1600 toward the primary cavity 1606 of the secondary outsole 1602. A primary, protrusion 1612 is disposed at an end of the elongate body 1616. The primary protrusion 1612 extends at least partially within the cavity 1606. A z-axis Z is defined through the secondary cavity 1608 and substantially normal to a ground surface. A y-axis Y extends substantially from the secondary cavity 1608 through the primary protrusion 1600. An x-axis X extends substantially normal to, a plane created by the z-axis Z and the y-axis Y. The primary protrusion 1612 is a pin that is rotatably engaged with the primary cavity 1606. The primary protrusion 1612 pin, the elongate body 1616, and by extension the midsole 1610 is able to rotate about the y-axis Y. The primary protrusion 1612 pin is also reversibly engageable within the primary cavity 1606 about the x-axis X. The outsole ribs 1620 adjacent, with the midsole ribs 1622 prevent substantial rotation about the z-axis Z.

Figure 17A:
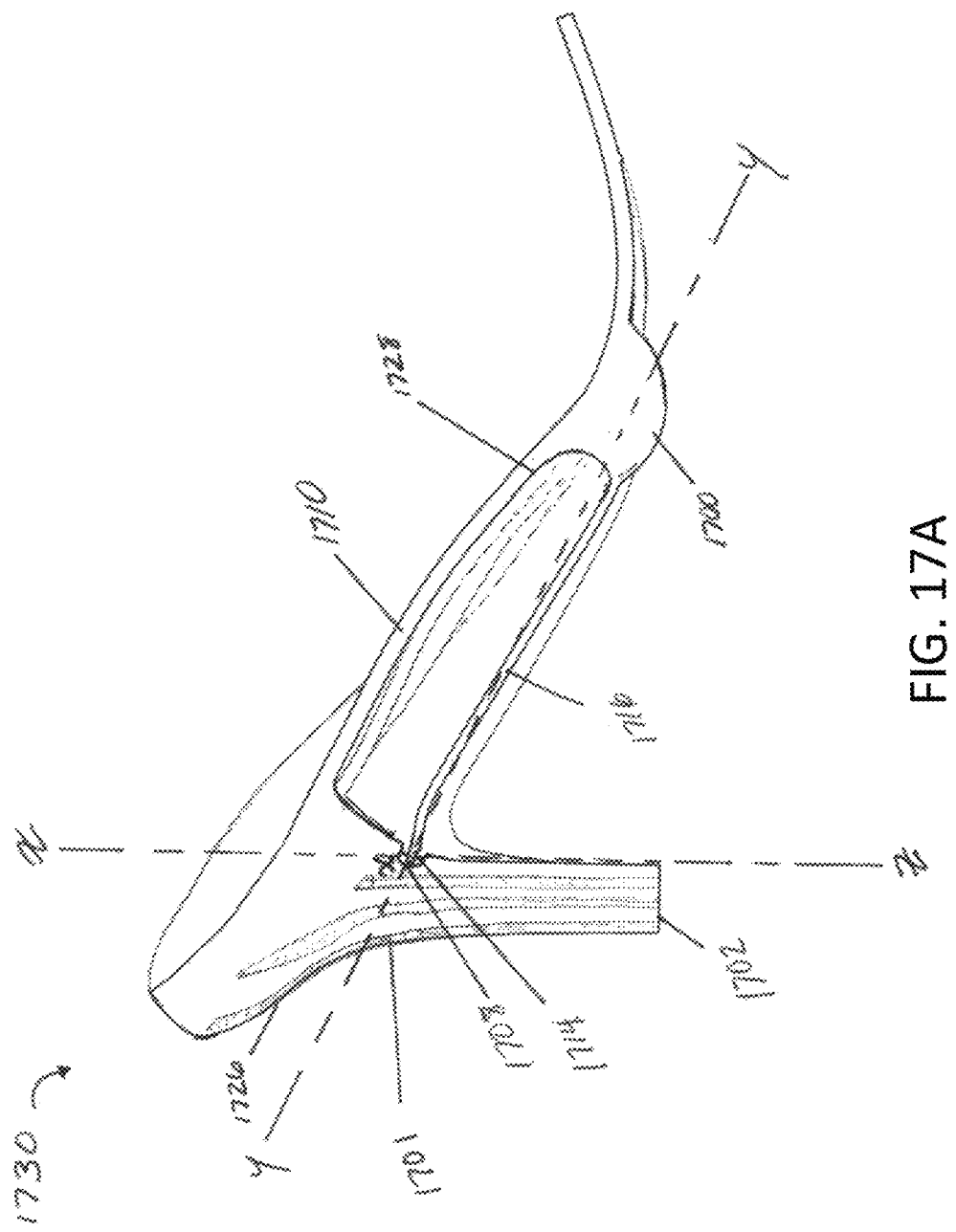
FIGS. 17A-17D illustrate a footwear device with a rotatable midsole, in accordance with an embodiment of the present disclosure.
Figure 17B:
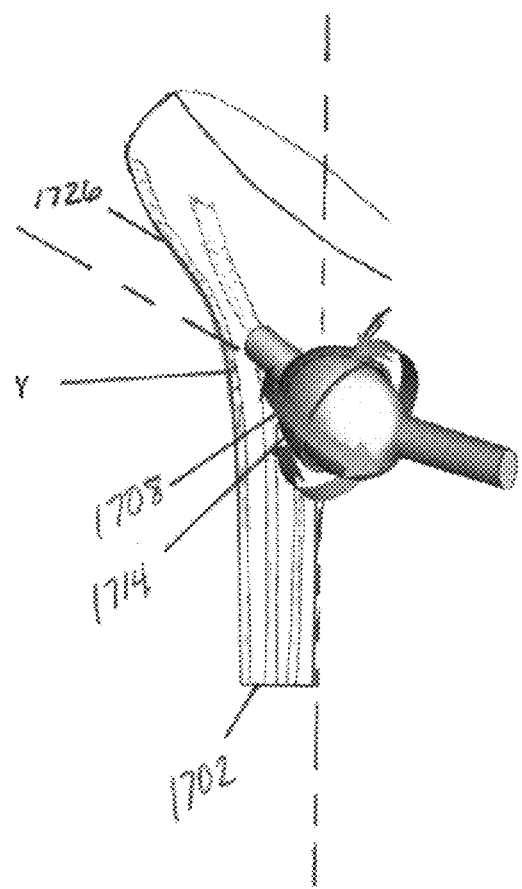
Figure 17C:
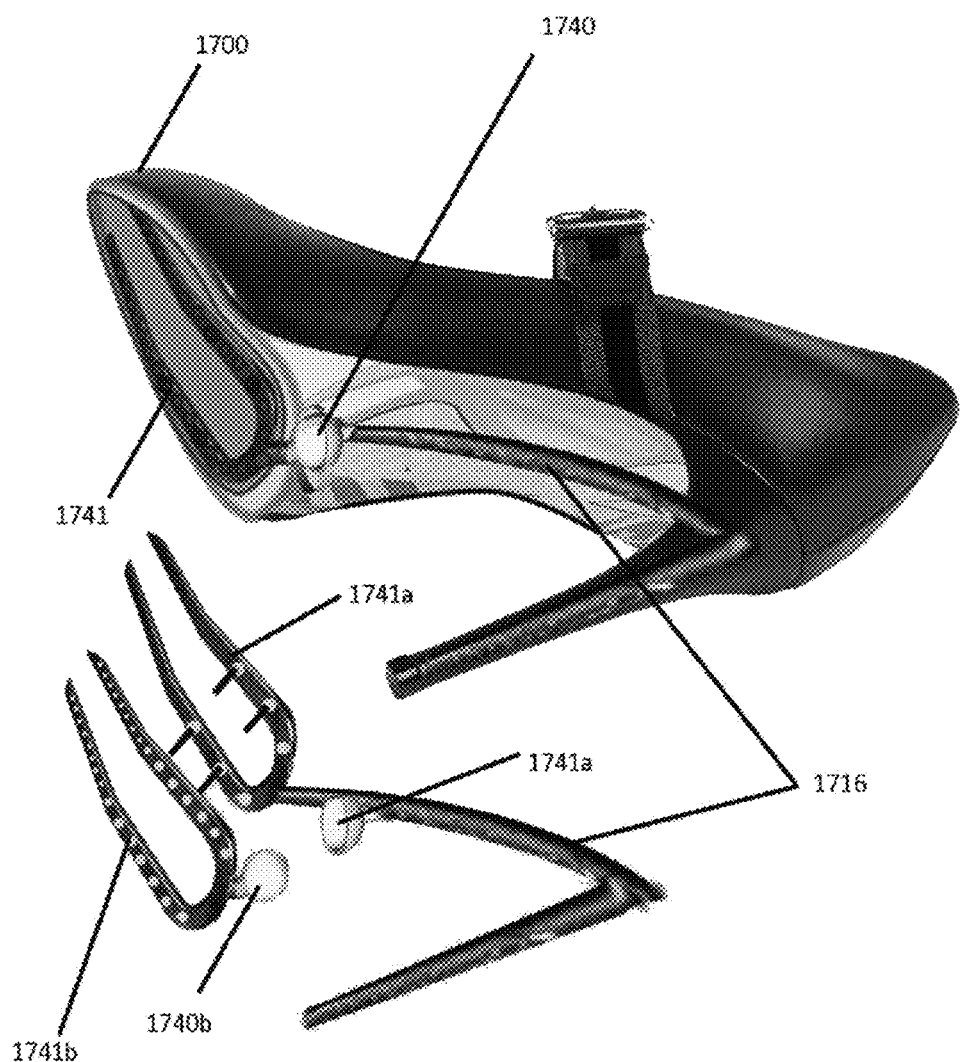
Figure 17D:

FIGS. 17A through 17D illustrate an embodiment of a rotatable midsole ambulatory footwear device including a unibody sole 1730. The unibody sole 1730 includes a posterior outsole portion 1702 that has a cavity 1708. A midsole portion 1710 is disposed on a top portion 1726 of the posterior outsole portion 1702. The midsole portion 1710 extends away from the posterior outsole portion 1702. An anterior outsole portion 1700 extends from a bottom portion 1728 of the midsole portion 1710. An elongate body 1716 extends from the anterior outsole portion 1700 toward the posterior outsole portion 1702. A protrusion 1714 is disposed at an end of the elongate body 1716. The protrusion 1714 extends at least partially within the cavity 1708. The unibody sole 1730 defines a z-axis Z through the cavity 1708 and substantially normal to a ground surface. A y-axis Y extends substantially from the cavity 1708 through the elongate body 1716 and the primary outsole portion 1700. An x-axis X extends substantially normal to a plane created by the z-axis Z and the y-axis Y. The protrusion 1714 is pin that is rotatably engaged with the cavity 1708. The elongate body 1716, and by extension the midsole 1710 is able to rotate about the y-axis Y. The protrusion 1714 pin is also reversibly engageable within the cavity 1708 about the x-axis X. The single cavity 1708 engaging the protrusion 1714 pin prevents substantial rotation about the z-axis Z. The protrusion 1714 pin may be of any controlled swivel action configuration, such as a reversible female/male ball and socket mechanism, as illustrated in FIG. 17B. FIGS. 17C-17D further illustrate a protrusion 1740 is connected to the front end of the elongate body 1716 and to a fork structure 1741 disposed on the ground-interfacing side proximate to the anterior outsole portion 1700. In one embodiment, the fork structure 1741 and the protrusion 1740 are composed of two pieces, 1741a-1741b and 1740a-1740b, respectively. The protrusion 1740 allows the midsole portion 1710 to rotate about the x-axis X and the y-axis Y, while rotation about the z-axis Z is limited in the manner described above. The midsole portion 1710, the posterior outsole portion 1702, the anterior outsole portion 1700 can be of a rigid to semi-rigid material.

In various embodiments, the midsole and outsole ribs may instead be a midsole tooth extending into an outsole channel, or any other suitable complementary means. The tooth may freely move within the channel when rotating about the x-axis and about the y-axis, but may be locked when rotating about the z-axis by the tooth colliding with the sidewalls of the channel. The ribs or other z-rotation prevention feature may comprise, for example, a firm compression material such as ethylene-vinyl acetate (EVA) of about 30 durometer to about 50 durometer to allow some compression without compromising the rotational function of the midsole.

In various embodiments, a primary protrusion and a tertiary outsole may be positioned to avoid a fifth metatarsal of a wearer's foot disposed over a midsole. Positioning these anterior ground-interfacing soles such that they avoid these portions of the foot may allow for comfortable eversion movement in a step.

In various embodiments, an elongate body may be thin and flexible to succumb to desirable warping about the x-axis and/or y-axis. Warping of the elongate body may include twisting that assists with rotation of a midsole. The elongate body may comprise many bodies such as, e.g., a leaf spring, a series of plates, a series of discs, or the like.

Various embodiments herein may include features that allow for, sole flexibility, compression, and/or ground traction with a complete lack of or a substantial lack of soft materials or features such as foam, gels, springs, or the like. Such soft materials in footwear may not allow for proper foot alignment during movement. It may be desirable to provide flexibility, compression, and/or traction solely using rigid and/or semi-rigid materials for proper foot support and alignment.

Figure 18:
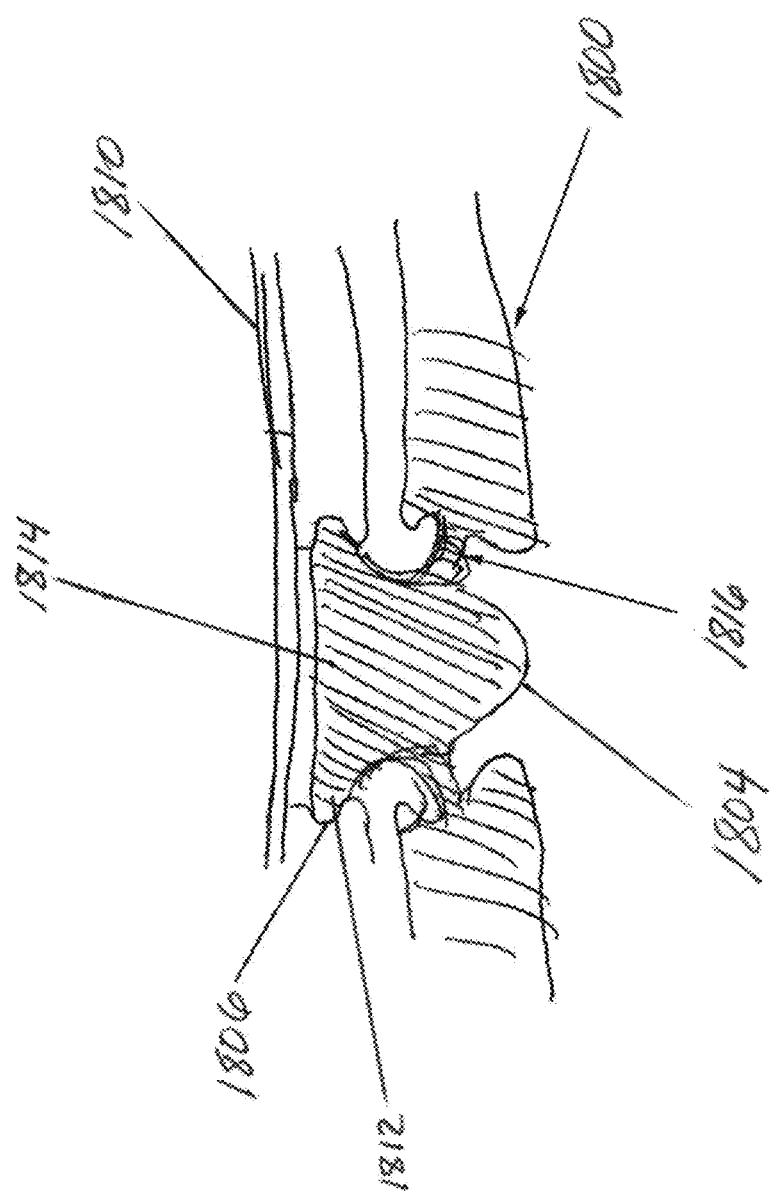
FIG. 18 illustrates a side cross-sectional view of a footwear device with a rotatable midsole, in accordance with an embodiment of the present disclosure.

Referring to FIG. 18, a side cross-sectional view of an embodiment of a rotatable midsole ambulatory footwear device is illustrated including a stud 1814 that engages a midsole 1810. The engagement portion 1812 of the stud 1814 engages the locking ring 1806 of the midsole 1810. This the stud 1814 may be locked into the locking ring 1806, which may be reversible (e.g., snapped in) or the stud 1814 may be co-molded or over-molded with the locking ring 1806. The stud 1814 includes two flex joints 1816 that extend away from the stud 1814 into outsoles 1800 that may engage a ground surface. During compression of the midsole 1810 onto the stud 1814, a traction stud portion 1804 of the stud 1814 may engage the ground surface for additional traction. The flex joints 1816 are free to bend to allow for flexibility when the outsoles 1800 engage a ground surface without the need for additional soft materials. The flex joints 1816 also provide resistance to a weight or force from the midsole 1810 (e.g., a cushioning resistance against a user's foot during a step motion).

Figure 19A:
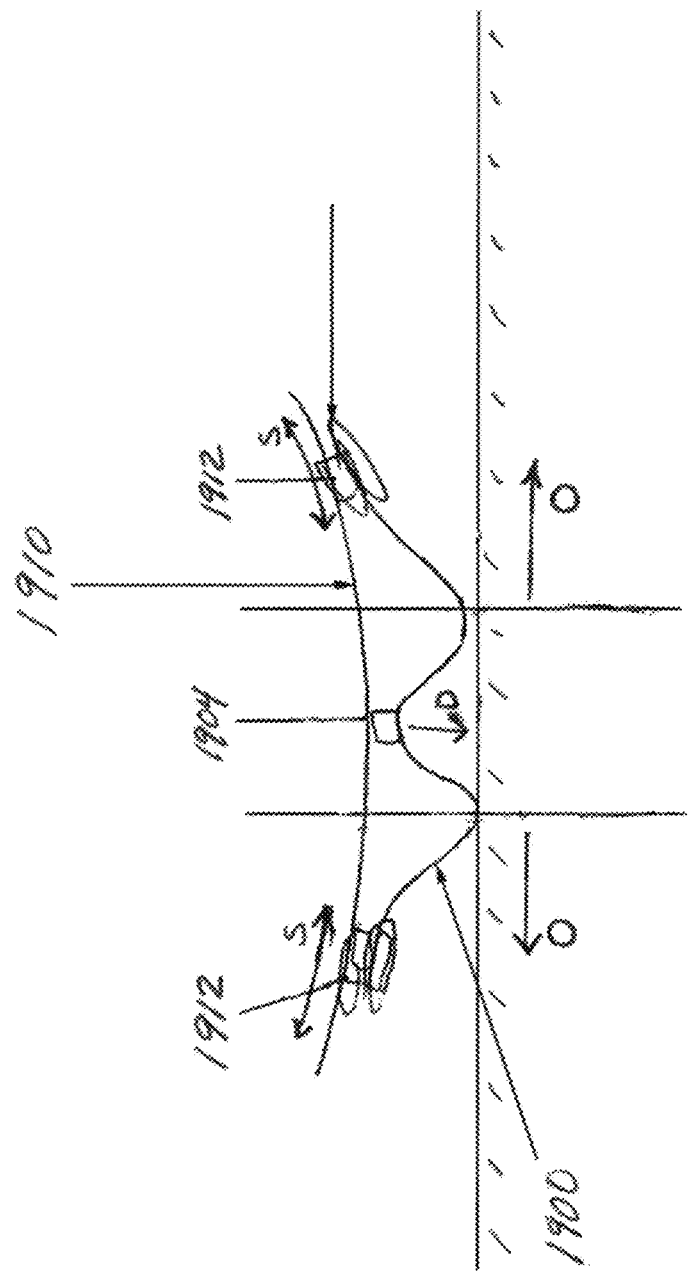
FIGS. 19A-19B illustrate a side cross-sectional view of a footwear device with a rotatable midsole, in accordance with an embodiment of the present disclosure.
Figure 19B:
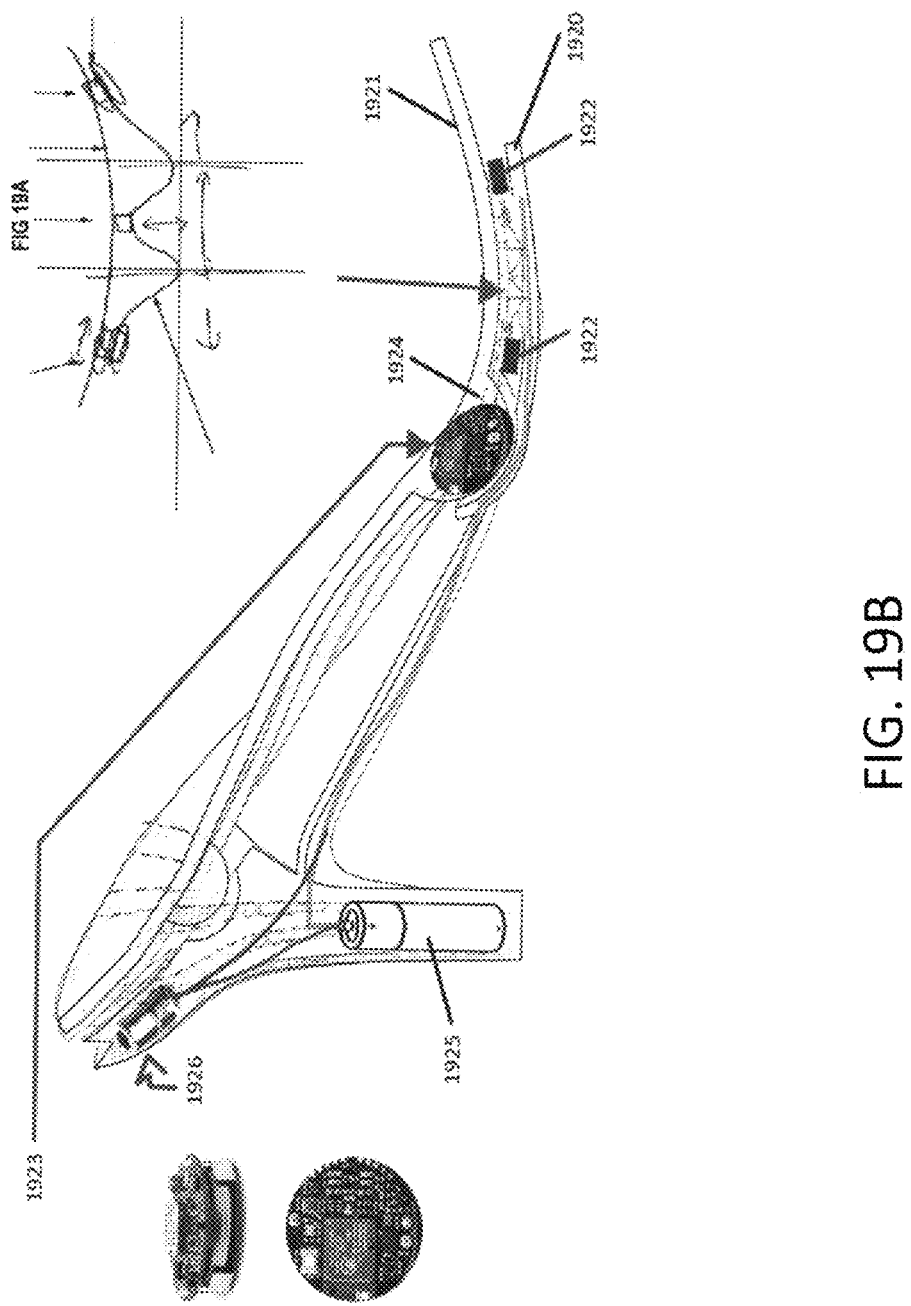

Referring to FIG. 19A, a side cross-sectional view of an embodiment of a rotatable midsole ambulatory footwear device is illustrated including a curved arm 1910 including a flexible outsole 1900. This flexible outsole 1900 is curved into a generally "W" shape in the resting position. The ends of the outsole 1900 are slidingly attached to the arm 1910 via the slide lugs 1912 that are free to slide along a channel within the arm 1910. When the arm 1910 is compressed downwardly in, the direction, of the arrow D, the fixed point 1904 of the outsole 1900 moves down in the direction of the arrow D while the bottom portions of the "W" outsole 1900 move outwardly in the direction of the arrows O. Additionally, the ends of the "W" outsole 1900 attached to the slide lugs 1912 move outwardly along the arrows S. The result is a compressed outsole 1900 that brings the arm 1910 closer to the ground surface. The compressed outsole 1900 provides resistance to the arm 1910 to support the wearer's foot without the use of soft materials. FIG. 19B illustrates the structure of FIG. 19A incorporated between the front end of the primary outsole 1920 and the tertiary outsole 1921. As a wearer's foot moves and compressed downwardly on the tertiary outsole 1921 in the direction of arrow a the bottom portions of the "W" outsole 1900 moves outwardly in the direction of the arrows (see FIG. 19A). Proximately to the slide lugs 1912 are one or more pressure sensors 1922 for tracking motions along the x-axis X and the y-axis Y. A central motion sensor 1923 is disposed within the footwear device for collecting data captured by the pressure sensor 1922. For example, the central motion sensor 1923 may be attached to the primary protrusion 1924 but may be attached elsewhere. Additionally, the slide lugs 1912 may provide kinetic energy to a battery 1925 for storing power within a sole. The power stored in the battery 1925 may be used to power another device, such as a laser 1926. Although a "W" shape is illustrated for the outsole 1900, other shapes may be implemented, for example, any number of valleys making contact with the ground surface. The data captured by the sensors 1922 and 1924 may be transmitted to another device for processing, such as a software application executable on a computer, a mobile phone, headphones, sensory gloves, work out bars, knee/ankle sleeves, and any body attachment gear. These devices interpret the data and triggers a corresponding action. For example, an alarm can be triggered to alert the wearer of alignment issues between the wearer's foot and another part of the body and/or among multiple parts of the body.

Figure 20:
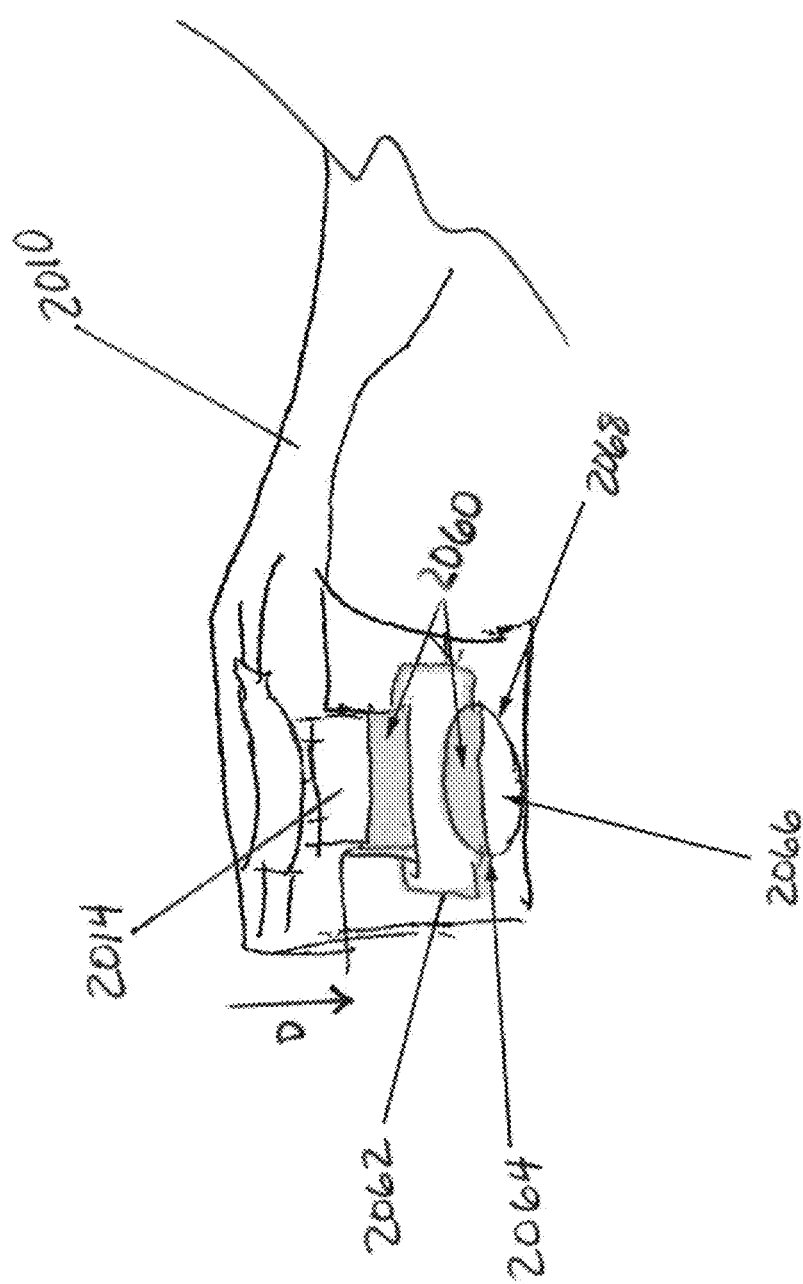
FIG. 20 illustrates a side cross-sectional view of a footwear device with a rotatable midsole, in accordance with an embodiment of the present disclosure.

Referring to FIG. 20, a side cross-sectional view of an embodiment of a rotatable midsole ambulatory footwear device is illustrated including a piston 2014 within a heel portion of a midsole 2010. Under compression, the piston 2014 may translate in a downward direction of the arrow D. The piston 2014 meets resistance in the downward motion by compressing and/or forcing a fluid 2060 through the fluid channels 2062 and into the accumulator sphere 2068. The accumulator sphere 2068 includes a diaphragm 2064 that flexes between and separates the fluid 2060 from a pressurized air chamber 2066 in the accumulator sphere 2068. In this way, the midsole 2010 may transfer a downward force to the piston 2014, which transfers the force to the fluid 2060, which transfers the force to the diaphragm 2064, which transfers the force to the compressible gas in the air chamber 2066. As such, a comfortable compressive resistance may be enjoyed by the wearer without the use of soft materials. The heel piston 2014 may act similarly to that of the protrusions and cavities described herein. Although illustrated in the heel, such a system may be included in the anterior portion of a foot apparatus.

Figure 21A:
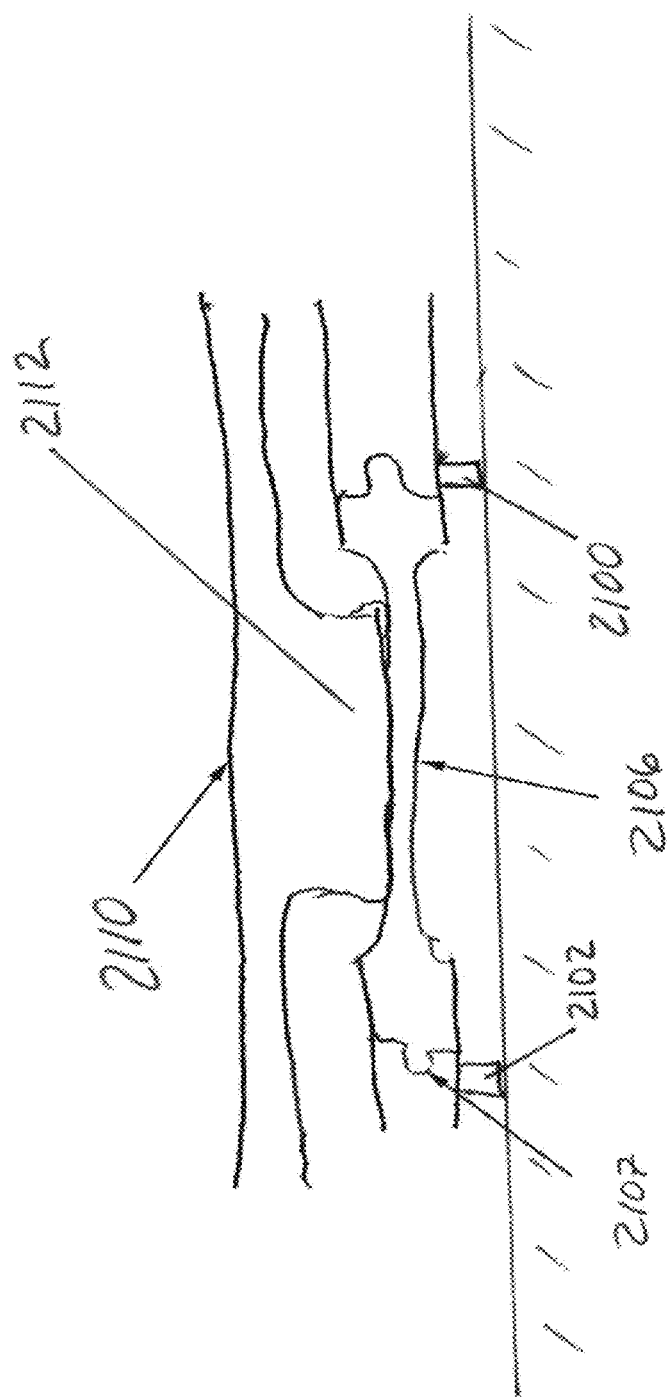
FIGS. 21A-21C illustrate a side cross-sectional view of a footwear device with a rotatable midsole, in accordance with an embodiment of the present disclosure.
Figure 21B:
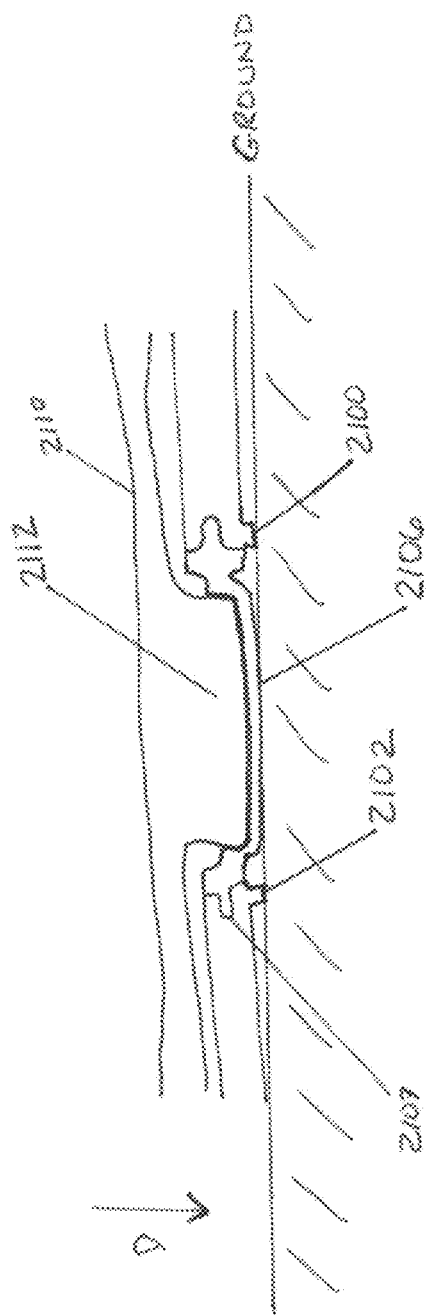
Figure 21C:
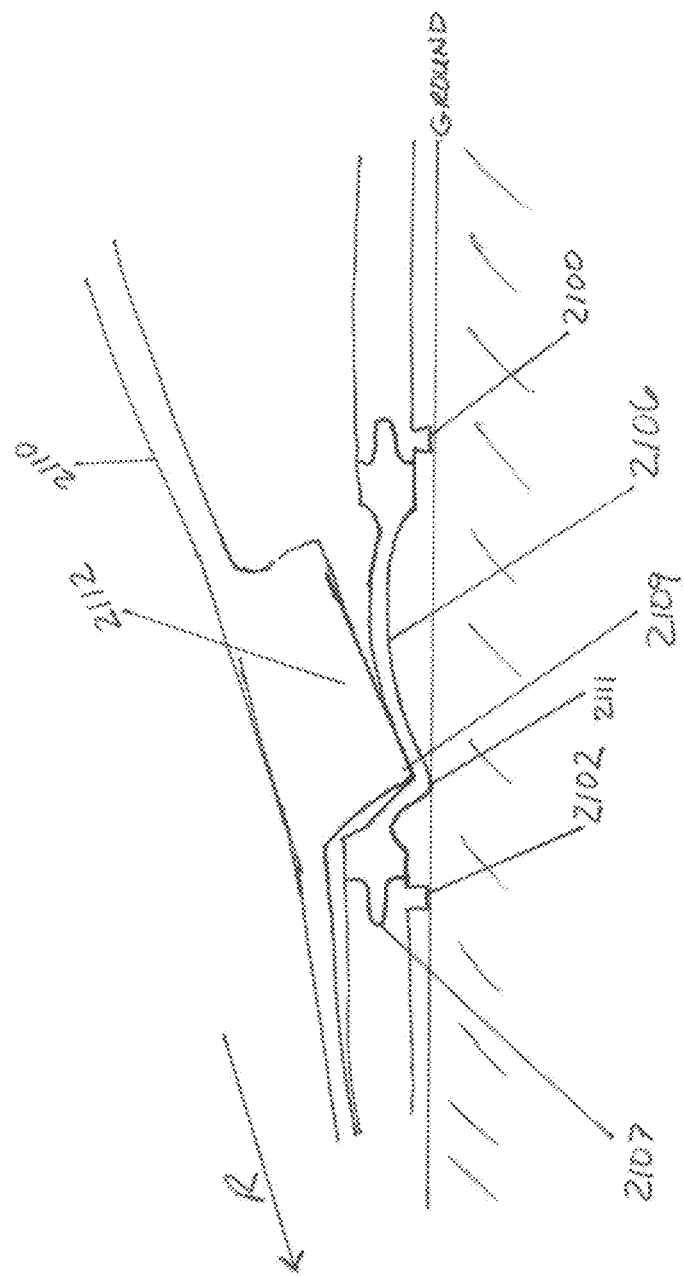

Referring to FIGS. 21A-21C, a side cross-sectional view of an embodiment of a rotatable midsole ambulatory footwear device is illustrated including a midsole 2110 having a trapezoidal protrusion 2112. The protrusion 2112 extends toward a diaphragm 2106 attached to a locking ring 2107. The locking ring 2107 extends to a primary and secondary sole 2100, 2102. The diaphragm 2106 is in a resting state in FIG. 21A. If the midsole 2110 is compressed with enough force towards the ground substantially in a direction of the arrow D (e.g., by a wearer stomping or landing flat on their feet), the protrusion 2112 may extend into and deform the diaphragm 2106 like that shown in FIG. 21B. The diaphragm 2106 may provide resistance to the protrusion 2112, midsole 2110, and the wearer's foot without the use of soft materials. The protrusion 2112 in combination with the diaphragm 2106 may be forced into substantially flat contact with the ground, providing an additional traction contact point for the wearer. In a substantially forward motion in the direction of arrow R (e.g., running motion) in FIG. 21C, a front portion 2109 of the protrusion 2112 may be forced into the diaphragm 2106. The resulting combination of the front portion 2109 deforming the diaphragm 2106 may result in a substantially triangular shape 2111 of the diaphragm 2106 contacting the ground for additional traction.

In various embodiments, one or more material layers may be disposed between, about, and/or within the protrusions of the midsole and the cavities of the primary and secondary outsoles. The material may be flexible to hold the midsole to the outsoles while permitting movement between the two. Such materials may include EVA, nylon, foam, thermoplastic polyurethane, rubber, a combination of these materials, or the like. Pockets of air may be located within these materials for comfort areas of compression. Such areas may be located substantially adjacent to a tuberosity of a fifth metatarsal, a fifth metatarsal head, a first metatarsal head, a brevis tendon, a calcaneus, and/or the like. Such areas may allow for the lowering of such anatomical portions of the foot during a step. Lowering of these areas, bones, and or tendons of the foot may increase blood flow from the foot and up the leg by aligning the foot with the leg and by increasing blood pressure returning through the associated veins. Aligning the foot and leg may better align associated veins for easier return of blood from the foot. The lowering of the previously mentioned areas of the foot may raise the mid-section of the foot, increasing blood pressure in the associated veins to pump blood up through the leg. Additionally, rotation of the foot about the x-axis and the y-axis in this position may assist with this pressure for blood to work through the veins and up the wearer's leg. A midsole may have a semi-rigid to rid foot interfacing surface and a more resilient outsole and/or ground interfacing surface. Such areas may be located, e.g., in an arm of an outsole. Specifically, for example, a relief area may be located in a sole adjacent to (e.g., below) the brevis tendon (near and/or at the ball of the pinky toe) such that when the midsole lifts the heel (e.g., in a high-heeled shoe), the bones and tendons about the ball of the pinky toe are allowed to be lowered to not disrupt joint alignment. A wrap or band about a portion of the compressible material (e.g., about a heel portion of a sole) may control the density of the compressible material by tightening or loosening the wrap via, e.g., a set screw, nut, or the like.

Figure 22:
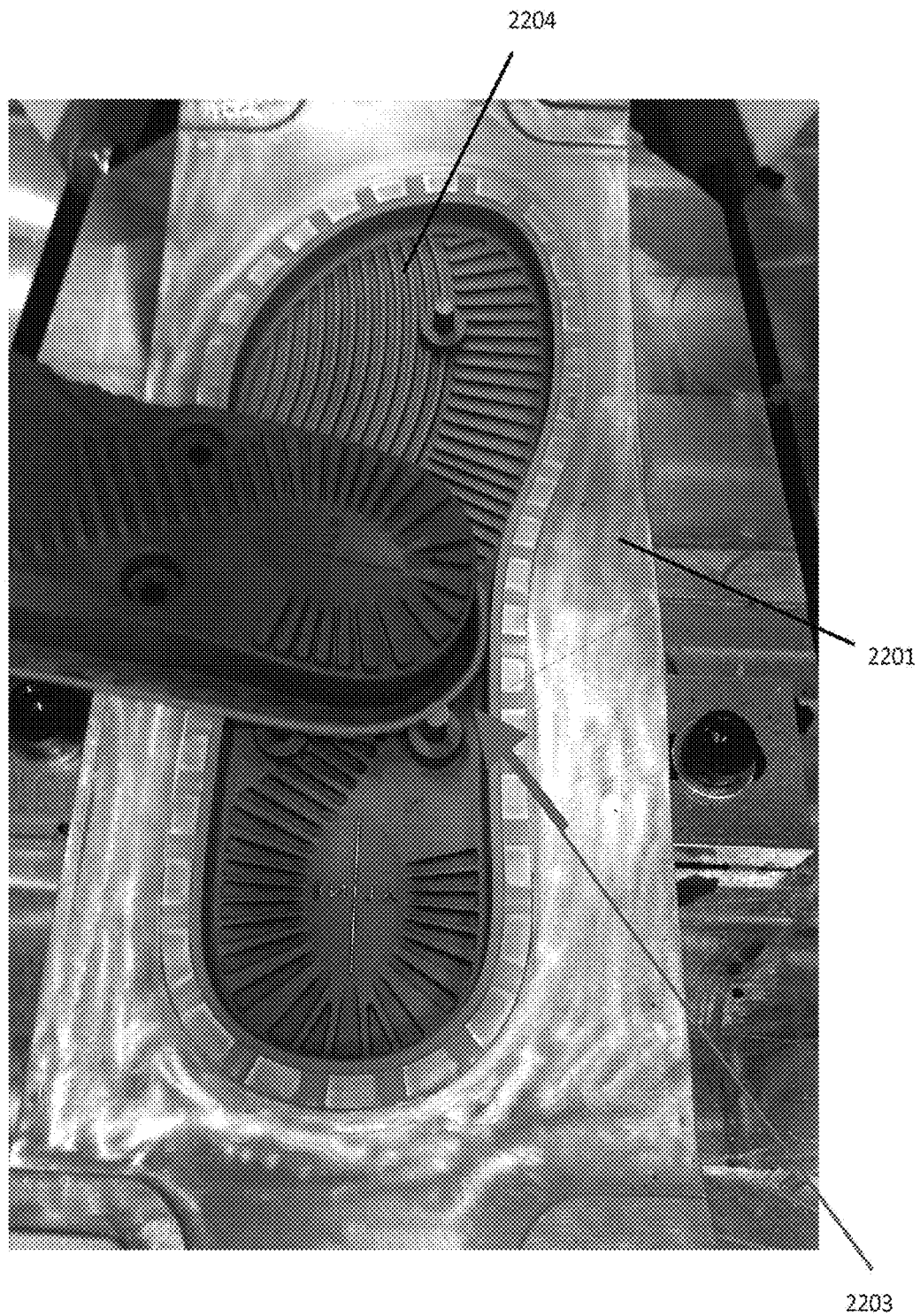
FIGS. 22-23 illustrate a method of manufacturing a footwear apparatus, in accordance with an embodiment of the present invention.
Figure 23:
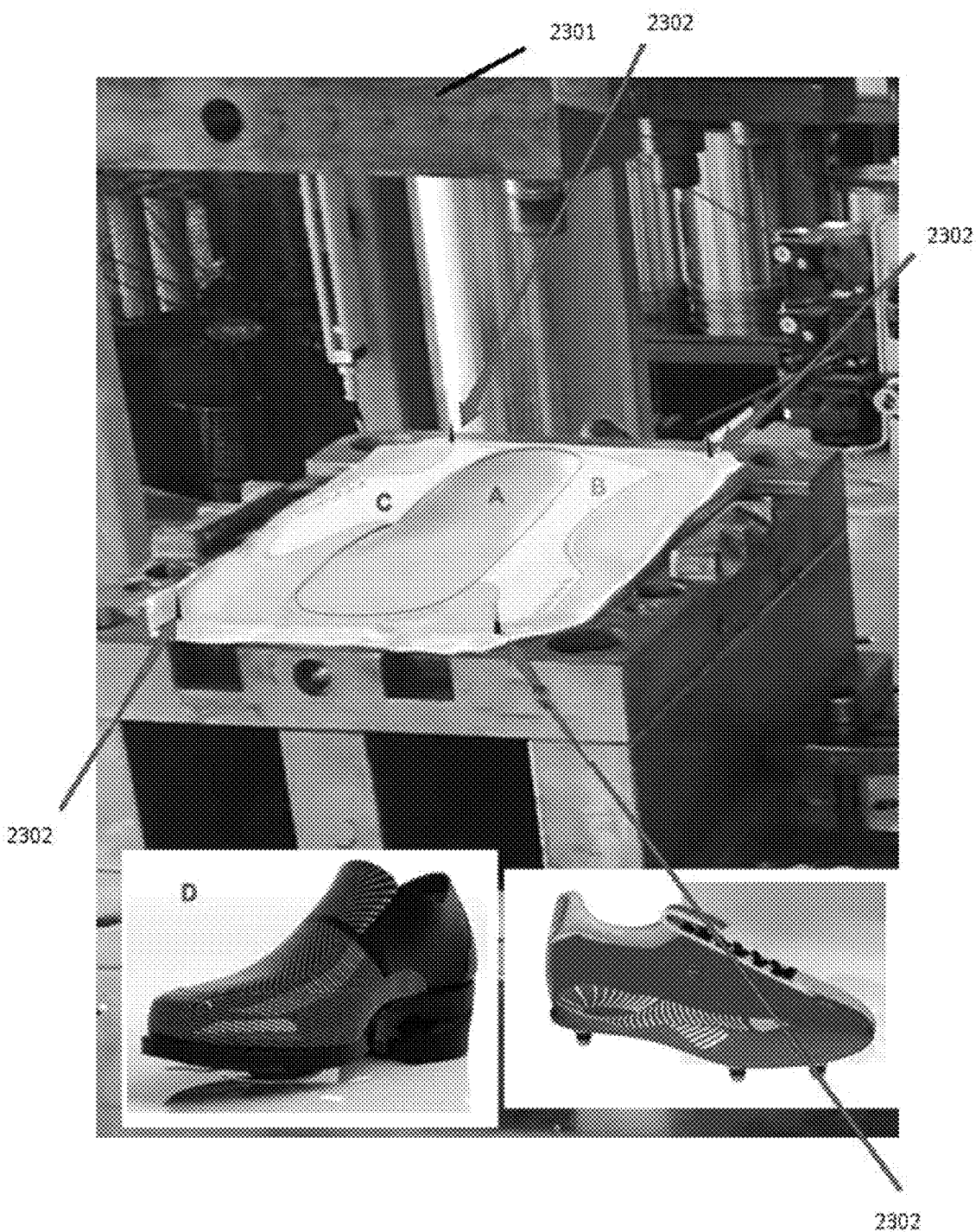

Certain embodiments of the present invention include a more reliable process for manufacturing footwear that reduces labor. A conventional approach is to use injection molding or to cast shoe soles. An upper is then glued or stitched to the sole. However, this conventional approach is labor intensive and has a potentially high rate of rejections for footwear that do not meet requirements. In the manufacturing process according to the present invention, the upper is attached during the midsole manufacturing stage, eliminating the steps of stitching or the potentially environmentally hazardous and costly gluing steps. Referring to FIGS. 22 and 23, the manufacturing process according to the present invention uses a tool that comprises a midsole mold, the midsole mold having a bottom portion 2201 and a top portion 2301. The bottom portion 2201 of the midsole mold has a cavity 2204. The footwear upper material A-C is placed onto the bottom portion of the midsole mold 2201. A first portion A of the upper material resides within the cavity 2204 of the bottom portion of the midsole mold 2201. A second portion B-C of the upper material extends beyond the boundaries of the cavity 2204 of the bottom portion of the midsole mold 2201 to which additional upper material is attached or with enough material to allow the second portion B-C to form the footwear upper. Pins 2302 or other retention means may be used with the bottom portion of the midsole mold 2201 to adjust the tension of the upper material A-C to avoid wrinkling of the upper material A-C when the midsole is molded. The tension may vary from heel to toe to eliminate wrinkles of the upper material A-C. The top portion of the midsole mold 2301 closes down onto the bottom portion of the midsole; mold 2201, and midsole material is injected into the midsole mold to form the midsole 2202. This fuses the first portion of the upper material A to the midsole 2202 without the need for stitching, or gluing. Textile or any impregnable material can be placed in the midsole mold in a manner that the material is impregnated with a moldable material such as but not limited to thermoplastic polyurethane (TPU), thermoplastic rubber (TPR), Nylon and or any other material that is moldable to impregnate textile to form a bond that is strong. The second portion of the upper material B-C is then formed along the circumference 2203 of the midsole 2202 to construct the sidewalls of the footwear. Alternatively, the second portion of the upper material B-C is used to construct straps or, a circumference wrap to which additional upper material is attached. For example, the fabric may be wrapped, tied, buckled, laced, or the like. A flexible material E, e.g. cloth fabric, and/or a rigid or semi-rigid material D, e.g. carbon fiber, may be used as the upper material A-C. The manufacturing process may be used to form an outsole, where impregnable material may be used as the upper material. The manufacturing process may also be used to form an insole, where impregnable material may be used to form a sock or liner for the footwear. The midsole may be formed such that the circumference of the midsole forms a tertiary outsole attached to a primary and secondary outsole. The midsole mole may also have a series of passthrough voids in the tertiary outsole section to form at least one ground contacting protrusion.

While certain embodiments of the present invention are described herein. It is, however, expressly noted that the present invention is not limited to these embodiments, but rather the intention is that additions and modifications to what was expressly described herein are also included within the scope of the invention. Moreover, it is to be understood that the features of the various embodiments described herein are not mutually exclusive and can exist in various combinations and permutations, even if such combinations or permutations are not made expressly herein, without departing from the spirit and scope of the invention. In fact, variations, modifications, and other implementations of what is described herein will occur to those of ordinary skill in the art without departing from the spirit and the scope of the invention. As such, the invention is not to be defined only by the illustrative description herein.

What is claimed is:

1. A footwear apparatus, comprising:
   a primary outsole with a top side, a bottom side, a front end, and a back end, the primary outsole comprising a primary cavity at the top side and proximate to the front end of the primary outsole;
   a secondary outsole with a top end and a bottom end, the back end of the primary outsole connected to the secondary outsole between the top end and the bottom end of the secondary outsole, the secondary outsole comprising a secondary cavity at the top end of the secondary outsole;
   a midsole with a top side, a bottom side, a front end, and a back end, the midsole movably disposed over the top side of the primary outsole and the top end of the secondary outsole, the midsole comprising a primary protrusion proximate to the front end of the midsole, the primary protrusion protruding away from the bottom side of the midsole and extending at least partially within the primary cavity when the midsole engages the primary outsole; and
   a tertiary outsole disposed at the front end of the midsole and about the primary protrusion,
   wherein the footwear apparatus defines a z-axis through the secondary cavity and substantially normal to a ground surface, a y-axis extending substantially from the secondary cavity to the primary cavity, and an x-axis substantially normal to a plane created by the z-axis and the y-axis,
   wherein the midsole is configured to rotate substantially about the x-axis and the y-axis when the midsole engages the primary outsole and wherein the midsole is configured to resist rotation substantially about the z-axis,
   wherein the midsole further comprises: a secondary protrusion proximate to the back end of the midsole, the secondary protrusion protruding away from the bottom side of the midsole and extending at least partially within the secondary cavity when the midsole engages the secondary outsole,
   wherein the secondary outsole further comprises a plurality of outsole ribs disposed on the top end of the secondary outsole, the plurality of outsole ribs extending radially outward from the secondary cavity and increase in height as the plurality of outsole ribs extend radially outward from the secondary cavity,
   wherein the midsole further comprises a plurality of midsole ribs disposed on the bottom side and the back end of the midsole, the plurality of midsole ribs extending radially outward from the secondary protrusion,
   wherein central midsole ribs of the plurality of midsole ribs are disposed adjacent to and between two or more of the plurality of outsole ribs when the bottom side of the midsole engages the top end of the secondary outsole.

2. The footwear apparatus of claim 1, wherein an interaction between the plurality of outsole ribs and the plurality of midsole ribs substantially prevents rotation of the midsole about the z-axis.

* * * * *